US011955048B2

(12) United States Patent
Jang

(10) Patent No.: US 11,955,048 B2
(45) Date of Patent: Apr. 9, 2024

(54) DISPLAY DEVICE AND METHOD OF DRIVING DISPLAY DEVICE WITH DITHERING PATTERN BY RANDOM NUMBER TABLE

(71) Applicant: Samsung Display Co., Ltd., Yongin-si (KR)

(72) Inventor: Wonwoo Jang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/100,188

(22) Filed: Jan. 23, 2023

(65) Prior Publication Data

US 2023/0316980 A1 Oct. 5, 2023

(30) Foreign Application Priority Data

Apr. 1, 2022 (KR) ........................ 10-2022-0040853

(51) Int. Cl.
*G09G 3/20* (2006.01)
*G09G 3/3225* (2016.01)

(52) U.S. Cl.
CPC ......... *G09G 3/2044* (2013.01); *G09G 3/3225* (2013.01); *G09G 2300/0819* (2013.01); *G09G 2310/027* (2013.01); *G09G 2320/0285* (2013.01)

(58) Field of Classification Search
CPC ............... G09G 3/2044; G09G 3/3225; G09G 2300/0819; G09G 2310/027; G09G 2320/0285; G09G 3/2022; G09G 5/026; G09G 3/20; G09G 3/3607; G09G 3/006;
(Continued)

(56) References Cited

U.S. PATENT DOCUMENTS

2007/0091042 A1* 4/2007 Chung ................ G09G 3/3648
345/88
2007/0109245 A1* 5/2007 Hwang ................. G09G 3/006
345/98
(Continued)

FOREIGN PATENT DOCUMENTS

| | | | |
|---|---|---|---|
| KR | 101561465 | B1 | 10/2015 |
| KR | 1020200076317 | A | 6/2020 |
| KR | 1020210079463 | A | 6/2021 |

*Primary Examiner* — Richard J Hong
(74) *Attorney, Agent, or Firm* — CANTOR COLBURN LLP

(57) ABSTRACT

A display device includes a display panel and a panel driving block that controls driving of the display panel. The panel driving block includes a dithering judgment block, a memory, and a dithering compensation block. The dithering judgment block determines whether a first sub-image signal corresponding to a first image requiring dithering is included in the input image signal. The dithering compensation block reads out dithering patterns, which correspond to the first sub-image signal, from among the plurality of dithering patterns from the memory, generates a compensation dithering pattern by the read dithering patterns and a random number table, and outputs a correction image signal through the first sub-image signal and the compensation dithering pattern. The first image is displayed in a stain area, and the stain area includes at least one unit area.

20 Claims, 16 Drawing Sheets

(58) Field of Classification Search
CPC .. G09G 3/2055; G09G 3/2092; G09G 3/2003; G09G 3/3648
See application file for complete search history.

(56) References Cited

U.S. PATENT DOCUMENTS

| | | | | |
|---|---|---|---|---|
| 2007/0126758 | A1* | 6/2007 | Hwang | G09G 3/2003 345/690 |
| 2007/0229420 | A1* | 10/2007 | Hwang | G09G 3/006 345/87 |
| 2008/0049051 | A1* | 2/2008 | Han | G09G 3/2092 345/77 |
| 2008/0238911 | A1* | 10/2008 | Chung | G09G 3/2055 345/214 |
| 2010/0060660 | A1* | 3/2010 | Bae | G09G 3/2055 345/596 |
| 2013/0141455 | A1* | 6/2013 | Wang | G09G 5/026 345/596 |
| 2016/0125787 | A1* | 5/2016 | Pyeon | G09G 3/2022 345/691 |
| 2016/0171939 | A1* | 6/2016 | Na | G09G 3/3607 345/88 |
| 2021/0090527 | A1* | 3/2021 | Lee | G09G 3/20 |
| 2021/0193017 | A1 | 6/2021 | Ahn et al. | |

* cited by examiner

DISPLAY DEVICE AND METHOD OF DRIVING DISPLAY DEVICE WITH DITHERING PATTERN BY RANDOM NUMBER TABLE

This application claims priority to Korean Patent Application No. 10-2022-0040853, filed on Apr. 1, 2022, and all the benefits accruing therefrom under 35 U.S.C. § 119, the content of which in its entirety is herein incorporated by reference.

BACKGROUND

1. Field

Embodiments of the disclosure described herein relate to a display device and a method of driving a display device, and more particularly, relate to a display device having improved display quality and a method of driving the display device.

2. Description of the Related Art

Each of multimedia electronic devices such as a television ("TV"), a mobile phone, a tablet personal computer ("PC"), a navigation system, a game console, or the like includes various types of display devices for displaying images.

In particular, an organic light-emitting display ("OLED") device, a quantum dot display device, a liquid crystal display ("LCD") device, a plasma display device, etc., are being used as a display device.

Compensation methods for improving the display quality of an image displayed on a display panel are employed in display devices.

SUMMARY

Embodiments of the disclosure provide a display device having improved display quality by displaying an image by a dithering pattern, and a method of driving the display device.

In an embodiment, a display device includes a display panel that displays an image, and a panel driving block that receives an input image signal and controls driving of the display panel. The panel driving block includes a dithering judgment block that determines whether a first sub-image signal corresponding to a first image requiring dithering is included in the input image signal. The panel driving block includes a memory that stores a plurality of dithering patterns respectively displayed in unit areas of the display panel. The panel driving block includes a dithering compensation block that reads out dithering patterns, which correspond to the first sub-image signal, from among the plurality of dithering patterns from the memory, generates a compensation dithering pattern by the read dithering patterns and a random number table, and outputs a correction image signal through the first sub-image signal and the compensation dithering pattern. The first image is displayed in a stain area of the display panel and the stain area includes at least one unit area.

In an embodiment of the disclosure, when a grayscale of the first image is a stain grayscale, the dithering judgment block determines whether the first sub-image signal is included in the input image signal, based on whether the stain grayscale is equal to or lower than a reference grayscale.

In an embodiment of the disclosure, the display panel includes a plurality of pixels, and each of the unit areas corresponds to at least one pixel among the plurality of pixels. The random number table includes a plurality of unit cells respectively corresponding to the unit areas included in the stain area and includes a plurality of area random numbers allocated to each of the plurality of unit cells.

In an embodiment of the disclosure, the display panel displays the first image in the stain area by 'n' dithering frames, in each of which each of a plurality of dithering patterns having the stain grayscale is displayed, as one dithering period where 'n' is a natural number. The panel driving block further includes a random number generator generating 'n' random numbers. The dithering compensation block allocates one of the 'n' random numbers to an area random number of each of the plurality of unit cells based on the first sub-image signal among the plurality of area random numbers.

In an embodiment of the disclosure, the random number generator includes a linear feedback shift register.

In an embodiment of the disclosure, an initial seed value thus identical is provided to the random number generator at a respective dithering frame of the display panel among the 'n' dithering frames. The random number generator generates the 'n' random numbers by the initial seed value.

In an embodiment of the disclosure, the dithering compensation block includes a dithering generator that generates the compensation dithering pattern based on the read dithering patterns and the random number table.

In an embodiment of the disclosure, the dithering compensation block further includes a random number correction part that generates a correction random number table by correcting the random number table based on the one dithering period of the display panel. The dithering generator generates the compensation dithering pattern based on the read dithering patterns and the correction random number table.

In an embodiment of the disclosure, the random number correction part generates a plurality of correction area random numbers by adding a predetermined weight to the area random numbers included in the random number table at a respective dithering frame among the 'n' dithering frames. The correction random number table includes the plurality of correction area random numbers.

In an embodiment of the disclosure, the predetermined weight is a natural number from '0' to 'n−1'. The random number correction part generates the plurality of correction area random numbers by sequentially adding the predetermined weight to the plurality of area random numbers at the respective dithering frame.

In an embodiment of the disclosure, the panel driving block includes a controller that generates image data based on the input image signal and a source driver that generates data signal based on the image data and to provide the data signal to the display panel. The dithering judgment block, the memory, and the dithering compensation block are included in the controller. The controller further includes a data conversion block that generates the image data based on the correction image signal.

In an embodiment of the disclosure, the dithering judgment block further determines whether a second sub-image signal corresponding to a second image, which does not require dithering, is included in the input image signal. When the first sub-image signal and the second sub-image signal are included in the input image signal, the data conversion block generates the data signal based on the correction image signal and the second sub-image signal.

In an embodiment, a method of driving a display device further includes determining whether a stain image signal corresponding to a stain image requiring dithering is included in an input image signal. When the stain image signal is included in the input image signal, the method of driving a display device includes reading out dithering patterns, which correspond to the stain image signal, from among a plurality of dithering patterns, each of which is displayed in a unit area on a display panel, and generating a compensation dithering pattern by a random number table and the read dithering patterns. The method of driving a display device includes outputting a correction image signal through the stain image signal and the compensation dithering pattern. The stain image is displayed in a stain area of the display panel, and the stain area includes a plurality of unit areas.

In an embodiment of the disclosure, the display panel includes a plurality of pixel among the plurality of pixels, and each of the plurality of unit areas corresponds to at least one pixels. The random number table includes a plurality of unit cells respectively corresponding to the plurality of unit areas included in the stain area and includes a plurality of area random numbers allocated to each of the plurality of unit cells.

In an embodiment of the disclosure, when a grayscale of the stain image is a stain grayscale, the display panel displays an image corresponding to the correction image signal by 'n' dithering frames, in each of which each of a plurality of dithering patterns having the stain grayscale is displayed among the plurality of dithering patterns, as one dithering period.

In an embodiment of the disclosure, after the determining of whether the stain image signal is included in the input image signal, the method of driving a display device further includes generating 'n' random numbers and allocating one of the 'n' random numbers to an area random number of each of the plurality of unit cells based on the stain image signal and generating the random number table.

In an embodiment of the disclosure, the 'n' random numbers are generated by a linear feedback shift register. An initial seed value thus identical is provided to the linear feedback shift register at a respective dithering frame of the display panel. The linear feedback shift register generates the 'n' random numbers by the initial seed value.

In an embodiment of the disclosure, after the generating of the random number table, the method of driving a display device further includes generating a correction random number table by correcting the random number table based on the one dithering period of the display panel. The generating of the compensation dithering pattern includes generating the compensation dithering pattern by the read dithering patterns and the correction random number table.

In an embodiment of the disclosure, before the generating of the correction random number table, the method of driving a display device further includes counting the number of driving frames, in each of which the stain image signal is provided. The generating of the correction random number table includes generating the correction random number table by correcting the random number table based on the counted number of driving frames and the one dithering period.

In an embodiment of the disclosure, the method of driving a display device further includes displaying the stain image by providing the display panel with a data signal generated based on the correction image signal.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
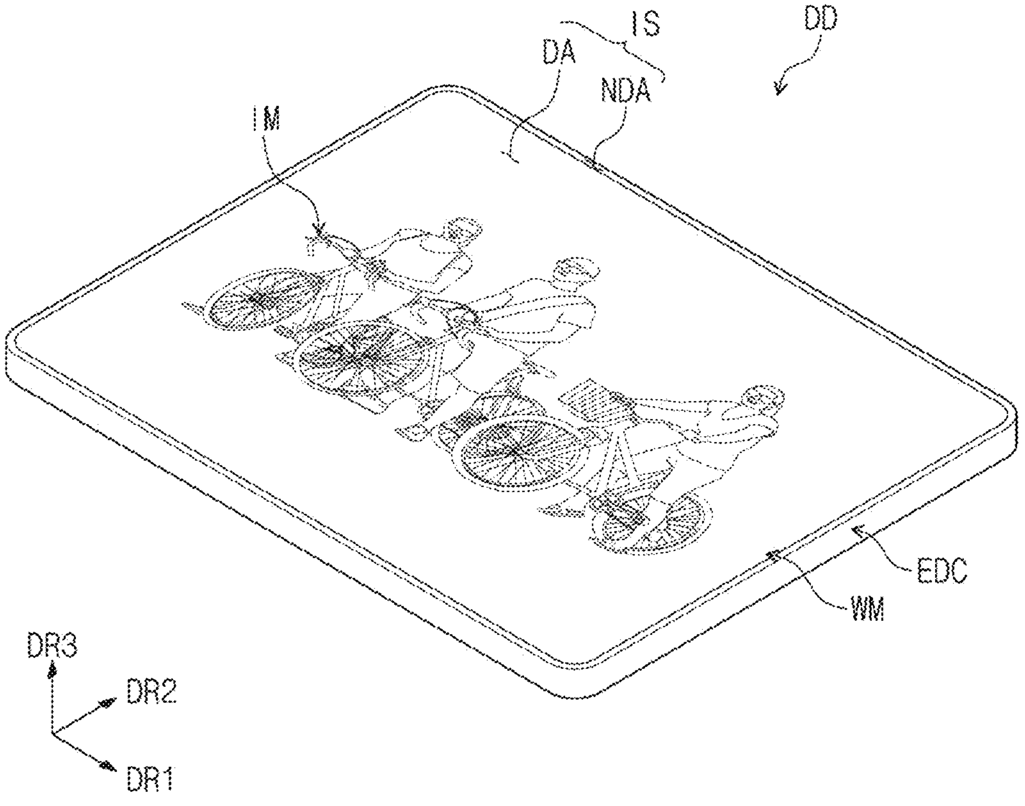
FIG. 1 is a perspective view of an embodiment of a display device, according to the disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. Without departing from the scope and spirit of the present disclosure, a first component may be referred to as a second component, and similarly, the second component may be referred to as the first component, for example. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

The term such as "block" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Hereinafter, embodiments of the disclosure will be described with reference to accompanying drawings.

Figure 2:
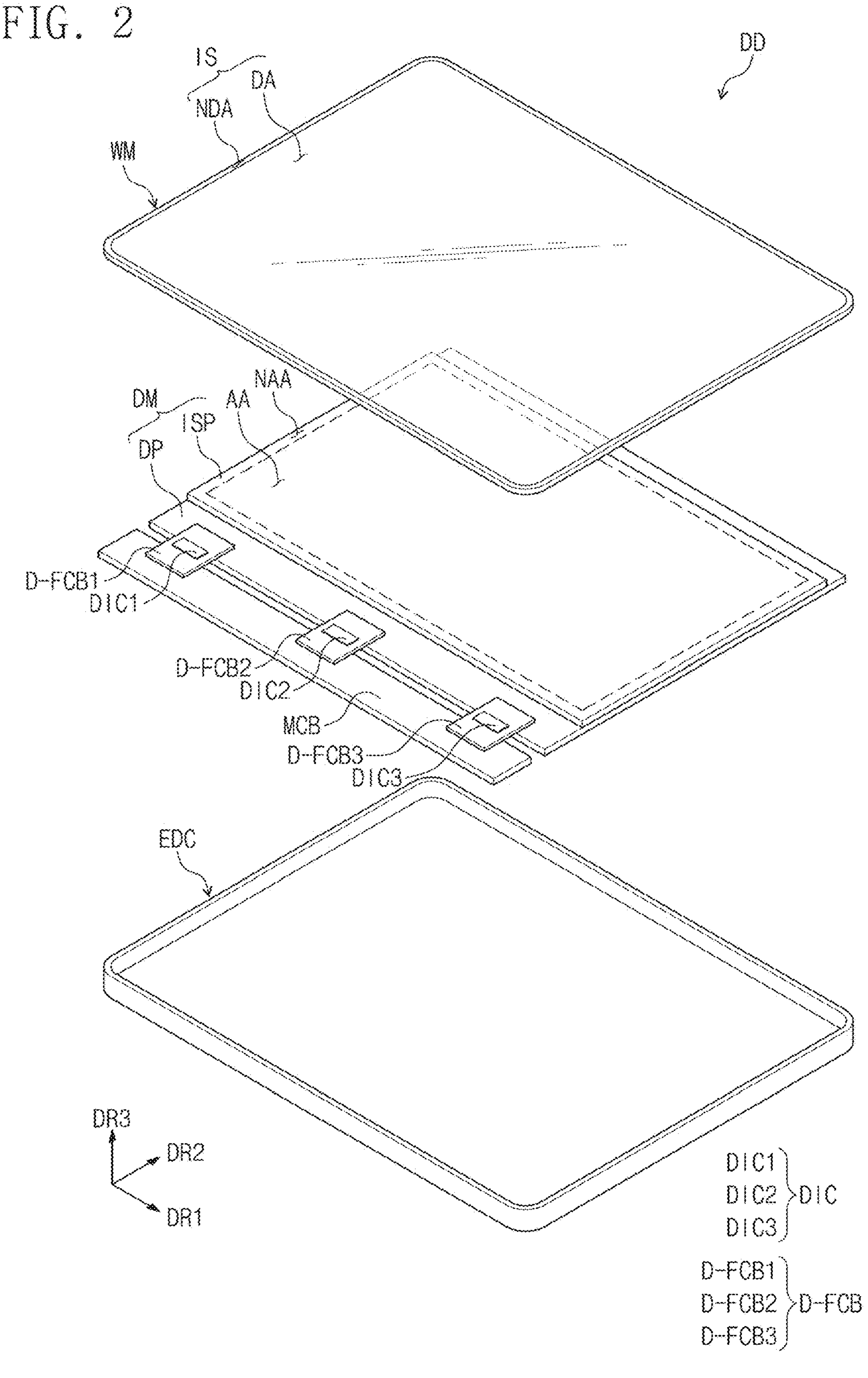
FIG. 2 is an exploded perspective view of an embodiment of a display device, according to the disclosure.

FIG. 1 is a perspective view of an embodiment of a display device, according to the disclosure. FIG. 2 is an exploded perspective view of an embodiment of a display device, according to the disclosure.

Referring to FIGS. 1 and 2, a display device DD may be a device activated depending on an electrical signal. The display device DD according to the disclosure may be a small and medium-sized electronic device, such as a mobile phone, a tablet personal computer ("PC"), a notebook computer, a vehicle navigation system, or a game console, as well as a large-sized electronic device, such as a television or a monitor. The above examples are provided only in an embodiment, and it is obvious that the display device DD may be applied to any other display device(s) without departing from the concept of the disclosure. The display device DD is in a shape of a quadrangle (e.g., rectangle) including a long side in a first direction DR1 and a short side in a second direction DR2 intersecting the first direction DR1. However, the shape of the display device DD is not limited thereto. In an embodiment, the display device DD may be implemented in various shapes. The display device DD may display an image IM on a display surface IS parallel to each of the first direction DR1 and the second direction DR2, for example, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD in an embodiment of the disclosure may sense an external input of a user, which is applied from the outside. The external input of the user may be one of various types of external inputs, such as a part of a body of the user, light, heat, a gaze of the user, pressure, or any combinations thereof. Also, the display device DD may sense the external input of the user applied to a side surface or a rear surface of the display device DD depending on a structure of the display device DD and is not limited to an embodiment. In an embodiment of the disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. The user perceives (or views) the image IM through the display area DA. In an embodiment, the display area DA is illustrated in the shape of a quadrangle whose vertexes are rounded. However, this is illustrated as an example. The display area DA may have various shapes, not limited to an embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated as an example. The non-display area NDA may be disposed adjacent to only one side of the display area DA or may be omitted. The display device DD in an embodiment of the disclosure may include various embodiments and is not limited to an embodiment.

As illustrated in FIG. 2, the display device DD may include a display module DM and a window WM disposed on the display module DM. The display module DM may include a display panel DP and an input sensing layer ISP.

In an embodiment of the disclosure, the display panel DP may include a light-emitting display panel. In an embodiment, the display panel DP may be an organic light-emitting display panel, an inorganic light-emitting display panel, a quantum dot light-emitting display panel, for example. An emission layer of the organic light-emitting display layer may include an organic light-emitting material. An emission layer of the inorganic light-emitting display panel may include an inorganic light-emitting material. An emission layer of the quantum dot light-emitting display panel may include a quantum dot, a quantum rod, or the like. Hereinafter, in an embodiment, the description will be given under the condition that the display panel DP is an organic light-emitting display panel.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. In an embodiment of the disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may include a transparent material capable of outputting the image IM. In an embodiment, the window WM may include glass, sapphire, plastic, etc., for example. It is illustrated that the window WM is implemented with a single layer. However, the disclosure is not limited thereto. In an embodiment, the window WM may include a plurality of layers, for example.

Although not illustrated, the non-display area NDA of the display device DD described above may correspond to an area that is defined by printing a material including a given color on one area of the window WM. In an embodiment of the disclosure, the window WM may include a light-blocking pattern for defining the non-display area NDA. The light-blocking pattern may be formed by a coating method, as a colored organic film.

The window WM may be coupled to the display module DM through an adhesive film. In an embodiment of the disclosure, the adhesive film may include an optically clear adhesive ("OCA") film. However, the adhesive film is not limited thereto. In an embodiment, the adhesive film may include a typical adhesive or sticking agent, for example. In an embodiment, the adhesive film may include an optically clear resin ("OCR") or a pressure sensitive adhesive ("PSA") film, for example.

An anti-reflection layer may be further disposed between the window WM and the display module DM. The anti-reflection layer decreases the reflectivity of external light incident from above the window WM. The anti-reflection layer in an embodiment of the disclosure may include a retarder and a polarizer. The retarder may have a film type or a liquid crystal coating type and may include a $\lambda/2$ retarder and/or a $\lambda/4$ retarder. The polarizer may also be a polarizer of a film type or a liquid crystal coating type. The film type may include a stretch-type synthetic resin film, and the liquid crystal coating type may include liquid crystals arranged in a given direction. The retarder and the polarizer may be implemented with one polarization film.

In an embodiment of the disclosure, the anti-reflection layer may also include color filters. The arrangement of the color filters may be determined in consideration of colors of light generated from a plurality of pixels PX (refer to FIG. 3) included in the display panel DP. Also, the anti-reflection layer may further include a light-blocking pattern.

The display module DM may display the image IM depending on an electrical signal and may transmit/receive information about an external input. The display module DM may be defined by an active area AA and an inactive area NAA. The active area AA may be defined as an area through which the image IM provided from the display area DA is output. Also, the active area AA may be defined as an area in which the input sensing layer ISP senses an external input applied from the outside.

The inactive area NAA is adjacent to the active area AA. In an embodiment, the inactive area NAA may surround the active area AA, for example. However, this is illustrated by way of example. The inactive area NAA may be defined in various shapes, not limited to an embodiment. In an embodiment, the active area AA of the display module DM may correspond to at least part of the display area DA.

The display module DM may further include a main circuit board MCB, a plurality of flexible circuit films D-FCB and a plurality of driver chips DIC. The main circuit board MCB may be connected with the flexible circuit films D-FCB so as to be electrically connected with the display panel DP. The flexible circuit films D-FCB may be connected with the display panel DP such that the display panel DP and the main circuit board MCB are electrically connected to each other. The main circuit board MCB may include a plurality of driver devices. The plurality of driver devices may include a circuit part for driving the display panel DP. The driver chips DIC may be disposed (e.g., mounted) on the flexible circuit films D-FCB.

In an embodiment of the disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be disposed to be spaced from each other in the first direction DR1 and may be connected with the display panel DP to electrically connect the display panel DP and the main circuit board MCB. The first driver chip DIC1 may be disposed (e.g., mounted) on the first flexible circuit film D-FCB1. The second driver chip DIC2 may be disposed (e.g., mounted) on the second flexible circuit film D-FCB2. The third driver chip DIC3 may be disposed (e.g., mounted) on the third flexible circuit film D-FCB3. However, the disclosure is not limited thereto. In an embodiment, the display panel DP may be electrically connected with the main circuit board MCB through one flexible circuit film, and only one driver chip may be disposed (e.g., mounted) on the one flexible circuit film, for example. Also, the display panel DP may be electrically connected with the main circuit board MCB through four or more flexible circuit films, and driver chips may be respectively disposed (e.g., mounted) on the flexible circuit films.

A structure in which the first to third driver chips DIC1, DIC2, and DIC3 are respectively disposed (e.g., mounted) on the first to third flexible circuit films D-FCB1, D-FCB2, and D-FCB3 is illustrated in FIG. 2, but the disclosure is not limited thereto. In an embodiment, the first to third driver chips DIC1, DIC2, and DIC3 may be directly disposed (e.g., mounted) on the display panel DP, for example. In this case, a portion of the display panel DP, on which the first to third driver chips DIC1, DIC2, and DIC3 are disposed (e.g., mounted), may be bent such that the first to third driver chips DIC1, DIC2, and DIC3 are disposed on a rear surface of the display module DM. Also, the first to third driver chips DIC1, DIC2, and DIC3 may be directly disposed (e.g., mounted) on the main circuit board MCB.

The input sensing layer ISP may be electrically connected with the main circuit board MCB through the flexible circuit films D-FCB. However, the disclosure is not limited thereto. That is, the display module DM may additionally include a separate flexible circuit film for electrically connecting the input sensing layer ISP and the main circuit board MCB.

The display device DD further includes an outer case EDC accommodating the display module DM. The outer case EDC may be coupled with the window WM to define the exterior of the display device DD. The outer case EDC may absorb external shocks and may prevent a foreign material/moisture or the like from being infiltrated into the display module DM such that components accommodated in the outer case EDC are protected. In an embodiment of the disclosure, the outer case EDC may be provided in the form of a combination of a plurality of accommodating members.

The display device DD in an embodiment may further include an electronic module including various functional modules for operating the display module DM, a power supply module for supplying a power desired for overall operations of the display device DD, a bracket coupled with the display module DM and/or the outer case EDC to partition an inner space of the display device DD, etc.

Figure 3:
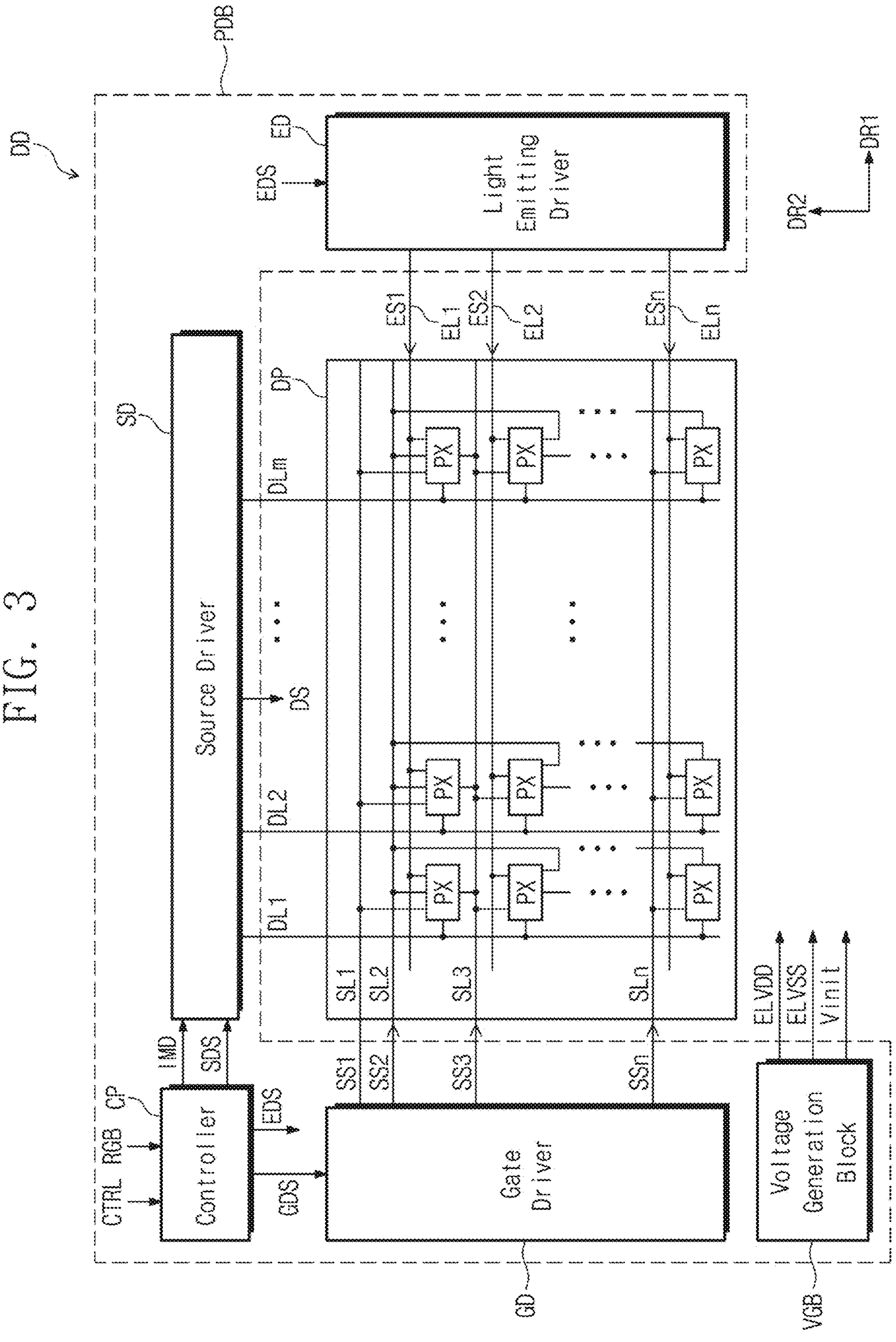
FIG. 3 is a block diagram of an embodiment of a display device, according to the disclosure.

FIG. 3 is a block diagram of an embodiment of a display device, according to the disclosure.

Referring to FIG. 3, the display device DD includes the display panel DP and a panel driving block PDB. The panel driving block PDB controls the driving of the display panel DP.

In an embodiment of the disclosure, the panel driving block PDB includes a controller CP, a source driver SD, a gate driver GD, a voltage generation block VGB, and a light-emitting driver ED.

The controller CP receives an input image signal RGB and an external control signal CTRL. The controller CP generates image data IMD by converting a data format of the image signal RGB in compliance with the specification for an interface with the source driver SD. In an embodiment of the disclosure, the controller CP generates a correction image signal CRGB_a (refer to FIG. 5) by correcting a first sub-image signal SRGB1 (refer to FIG. 5) included in the input image signal RGB. In this case, the controller CP generates image data IMD by converting a data format of the correction image signal CRGB_a in compliance with an interface specification with the source driver SD. In an embodiment of the disclosure, when the input image signal RGB includes the first sub-image signal SRGB1 and a second sub-image signal SRGB2 (refer to FIG. 5), the controller CP generates the image data IMD by converting the data format of the first and second sub-image signals SRGB1 and SRGB2 in compliance with the interface specification with the source driver SD. An operation of the controller CP will be described later with reference to FIGS. 5 to 13.

The controller CP generates a source driving signal SDS, a gate driving signal GDS, and an emission control signal EDS based on the external control signal CTRL. The external control signal CTRL may include a vertical synchronization signal, a horizontal synchronization signal, a main clock, etc.

The controller CP provides the image data IMD and the source driving signal SDS to the source driver SD. The source driving signal SDS may include a horizontal start signal allowing an operation of the source driver SD to start. In response to the source driving signal SDS, the source driver SD generates a data signal DS based on the image data IMD. The source driver SD outputs the data signal DS to a plurality of data lines DL1 to DLm (m is a natural number) to be described later. The data signal DS may refer to an analog voltage corresponding to a grayscale value of the image data IMD.

The controller CP transmits the gate driving signal GDS to the gate driver GD. The gate driving signal GDS may include a vertical start signal for starting an operation of the gate driver GD, a scan clock signal for determining output timing of scan signals SS1 to SSn (n is a natural number), etc. The gate driver GD generates the scan signals SS1 to SSn based on the gate driving signal GDS. The gate driver GD outputs the scan signals SS1 to SSn to a plurality of scan lines SL1 to SLn to be described later.

The controller CP transmits the emission control signal EDS to the light-emitting driver ED. The light-emitting driver ED outputs emission control signals ES1 to ESn to a plurality of emission lines EL1 to ELn in response to the emission control signal EDS.

The voltage generating block VGB generates voltages desired for an operation of the display panel DP. In an embodiment of the disclosure, the voltage generating block VGB generates a first driving voltage ELVDD, a second driving voltage ELVSS, and an initialization voltage Vinit. In an embodiment of the disclosure, the voltage generating block VGB may operate under control of the controller CP. In an embodiment of the disclosure, a voltage level of the first driving voltage ELVDD is greater than a voltage level of the second driving voltage ELVSS. In an embodiment of the disclosure, the voltage level of the first driving voltage ELVDD may be approximately 20 volts V to approximately 30 V. A voltage level of the initialization voltage Vinit is smaller than the voltage level of the second driving voltage ELVSS. In an embodiment of the disclosure, the voltage level of the initialization voltage Vinit may be approximately 1 V to approximately 9 V.

In an embodiment of the disclosure, the display panel DP includes the plurality of scan lines SL1 to SLn, the plurality of data lines DL1 to DLm, the plurality of emission lines EL1 to ELn, and the plurality of pixels PX.

The scan lines SL1 to SLn extend from the gate driver GD in the first direction DR1 and are arranged to be spaced from each other in the second direction DR2. The data lines DL1 to DLm extend from the source driver SD in a direction facing away from the second direction DR2 and are arranged to be spaced from each other in the first direction DR1.

Each of the pixels PX is electrically connected with three corresponding scan lines among the scan lines SL1 to SLn. Also, each of the pixels PX is electrically connected with one corresponding emission line among the emission lines EL1 to ELn and one corresponding data line among the data lines DL1 to DLm. In an embodiment, as illustrated in FIG. 3, a first row of pixels may be connected with the first to third scan lines SL1, SL2, and SL3, the first emission line EL1, and the first data line DL1, for example. However, a connection relationship between the pixels PX and the scan lines SL1 to SLn, the data lines DL1 to DLm, and the emission lines EL1 to ELn may be changed depending on a configuration of a driver circuit of the pixels PX.

Each of the pixels PX may include a light-emitting diode generating a color light. In an embodiment, the pixels PX may include red pixels generating red light, green pixels generating green light, and blue pixels generating blue light, for example. A light-emitting diode of a red pixel, a light-emitting diode of a green pixel, and a light-emitting diode of a blue pixel may include emission layers of different materials. In an embodiment of the disclosure, each of the pixels PX may include white pixels generating white light. In this case, an anti-reflection layer included in the display device DD may further include color filters. The display device DD may display the image IM based on light output after the white light passes through the color filters. However, in an embodiment of the disclosure, the pixels PX may consist of blue pixels that generate blue light. In this case, the display device DD may display the image IM based on light output after the blue light passes through the color filters. In an embodiment of the disclosure, when the blue light passes through the color filters, the passing light may have a color having a wavelength different from that of the blue light. In an embodiment of the disclosure, each of the color filters may include a quantum dot. The quantum dot is a particle capable of adjusting the wavelength of light emitted after the wavelength of incident light is converted. The quantum dot may control the wavelength of light emitted depending on a particle size. Accordingly, the quantum dot may emit light having the red light, the green light, and the blue light.

Each of the pixels PX includes a pixel circuit part controlling an emission operation of the light-emitting diode. The pixel circuit part may include a plurality of transistors and a capacitor. Each of the pixels PX receives the first driving voltage ELVDD, the second driving voltage ELVSS, and the initialization voltage Vinit.

Figure 4:
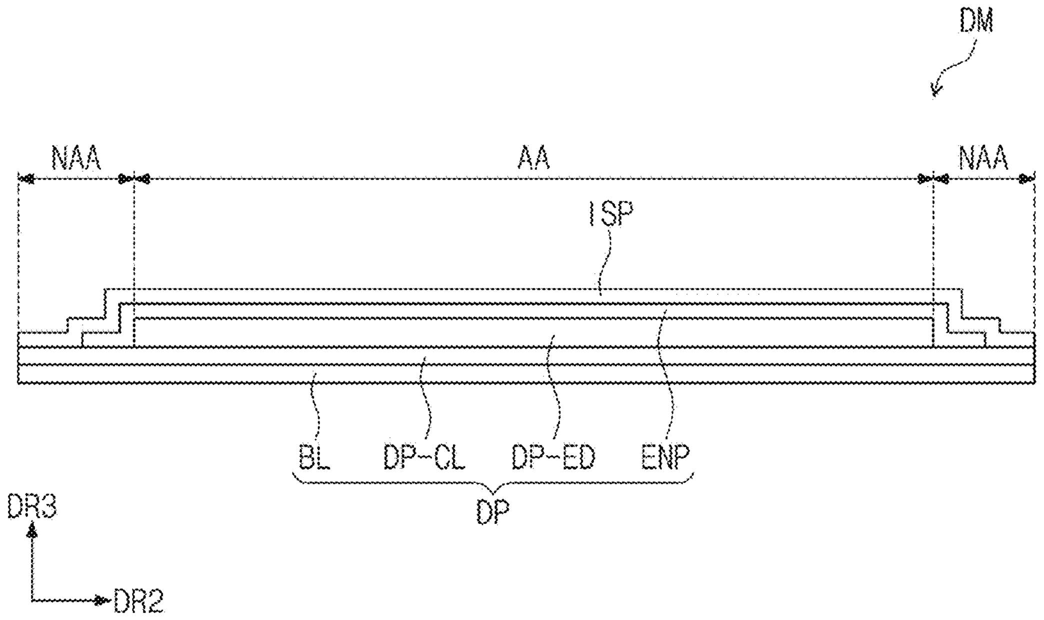
FIG. 4 is a cross-sectional view of a display module illustrated in FIG. 2.

FIG. 4 is a cross-sectional view of a display module illustrated in FIG. 2.

Referring to FIG. 4, the display module DM includes the display panel DP and the input sensing layer ISP. The display panel DP includes a base layer BL, a circuit element layer DP-CL disposed on the base layer BL, a display element layer DP-ED, and an encapsulation layer ENP. Although not separately shown in drawings, the display panel DP may further include functional layers such as an anti-reflection layer, a refractive-index adjustment layer, or the like.

The base layer BL may include at least one synthetic resin layer. In addition to the synthetic resin layer, the base layer BL may include a glass material layer, a metal material layer, or an organic/inorganic composite material layer. In an embodiment of the disclosure, the base layer BL may be a flexible layer. The active area AA and the inactive area NAA described with reference to FIG. 2 may be equally defined in the base layer BL.

The circuit element layer DP-CL is disposed on the base layer BL. The circuit element layer DP-CL includes at least one intermediate insulating layer and a circuit element. The intermediate insulating layer includes at least one intermediate inorganic layer and at least one intermediate organic layer. The circuit element includes signal lines, a pixel circuit part, or the like.

The display element layer DP-ED is disposed on the circuit element layer DP-CL. The display element layer DP-ED includes a plurality of pixels. Each of the pixels may include a light-emitting diode. In an embodiment of the disclosure, each of the pixels may include organic light-emitting diodes. The display element layer DP-ED may further include an organic film such as a pixel defining film.

The encapsulation layer ENP seals the display element layer DP-ED. The encapsulation layer ENP includes at least one inorganic layer. The encapsulation layer ENP may further include at least one organic layer. The inorganic layer protects the display element layer DP-ED from moisture/oxygen, and the organic layer protects the display element layer DP-ED from a foreign material such as a dust particle. The inorganic layer may include a silicon nitride layer, a silicon oxynitride layer and a silicon oxide layer, a titanium oxide layer, or an aluminum oxide layer. The organic layer may include, but is not limited to, an acrylic-based organic layer.

The input sensing layer ISP may be formed on the display panel DP by a sequential process. The input sensing layer ISP may have a multilayer structure. The input sensing layer ISP may include a single insulating layer or multiple insulating layers. In an embodiment of the disclosure, when the input sensing layer ISP is directly disposed on the display panel DP by a sequential process, the input sensing layer ISP is directly disposed on the encapsulation layer ENP, and an adhesive film is not interposed between the input sensing layer ISP and the display panel DP. However, in another embodiment, an adhesive film may be disposed between the input sensing layer ISP and the display panel DP. In this case, the input sensing layer ISP is not manufactured by a process continuous to that of the display panel DP. That is, the input sensing layer ISP may be manufactured through a process separate from that of the display panel DP and may then be fixed on an upper surface of the display panel DP by an adhesive film.

However, in an embodiment of the disclosure, the display panel DP may further include an encapsulation substrate. The encapsulation substrate may be disposed on the display element layer DP-ED so as to face the base layer BL. The encapsulation substrate may include a plastic substrate, a glass substrate, a metal substrate, or an organic/inorganic composite substrate. A sealant may be disposed between the encapsulation substrate and the base layer BL, and the encapsulation substrate and the base layer BL may be coupled to each other by the sealant. The sealant may include an organic adhesive or a frit being a ceramic adhesive material. The display element layer DP-ED may be sealed by the sealant and the encapsulation substrate.

When the input sensing layer ISP is directly disposed on the display panel DP by a sequential process, the input sensing layer ISP may be directly disposed on the encapsulation substrate. However, in another embodiment, when an adhesive film is disposed between the input sensing layer ISP and the display panel DP, the input sensing layer ISP may be fixed on the upper surface of the encapsulation substrate by the adhesive film.

Figure 5:
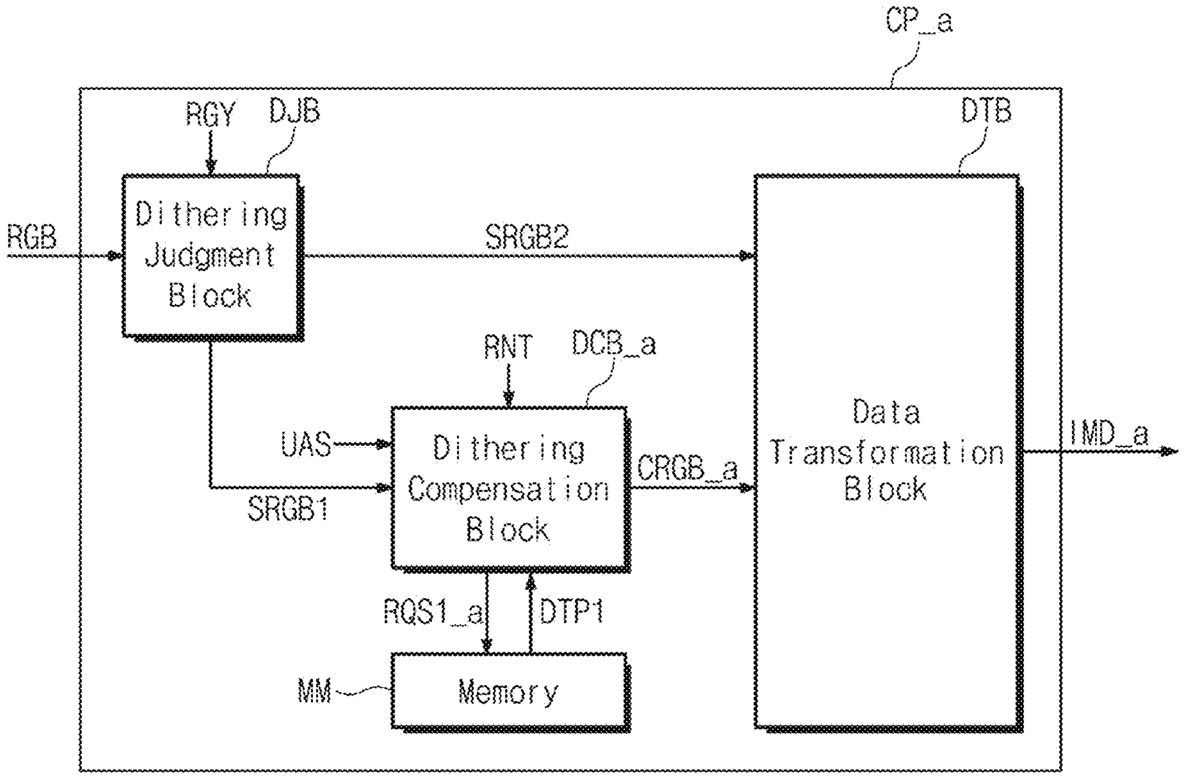
FIG. 5 is a block diagram for describing an embodiment of a configuration of a controller, according to the disclosure.
Figure 6:
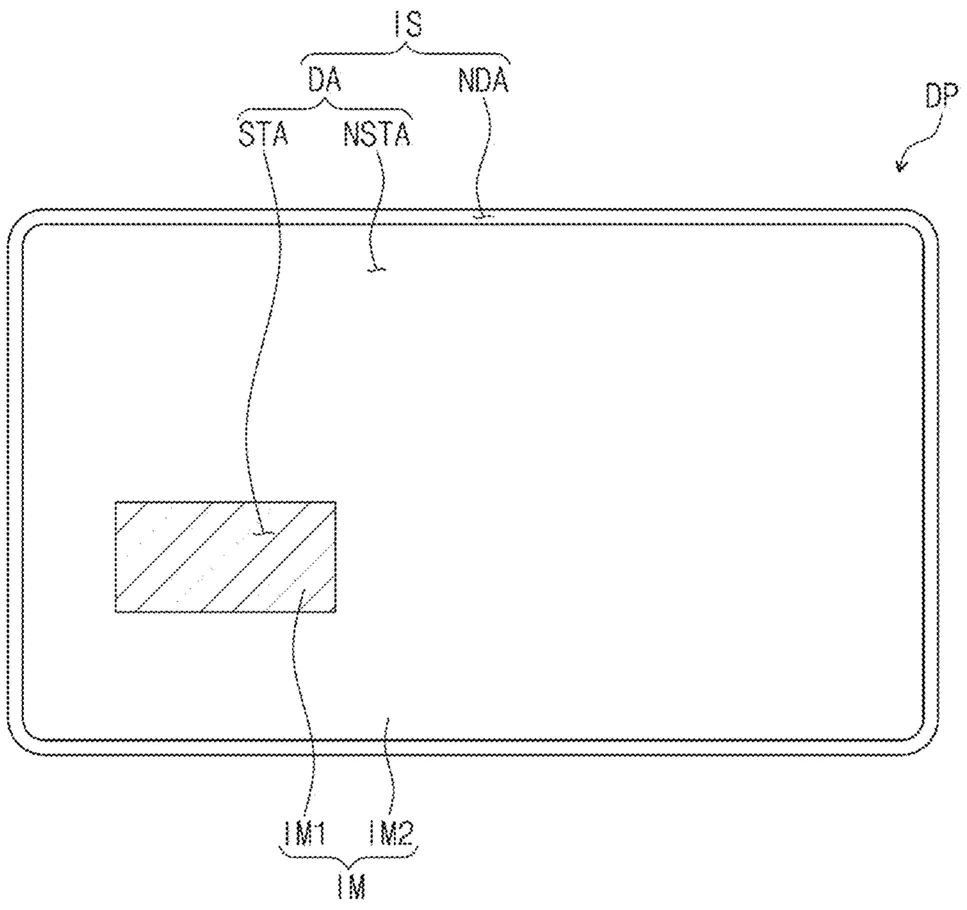
FIG. 6 is a conceptual diagram for describing an embodiment of an operation of a dithering judgment block, according to the disclosure.
Figure 7A:
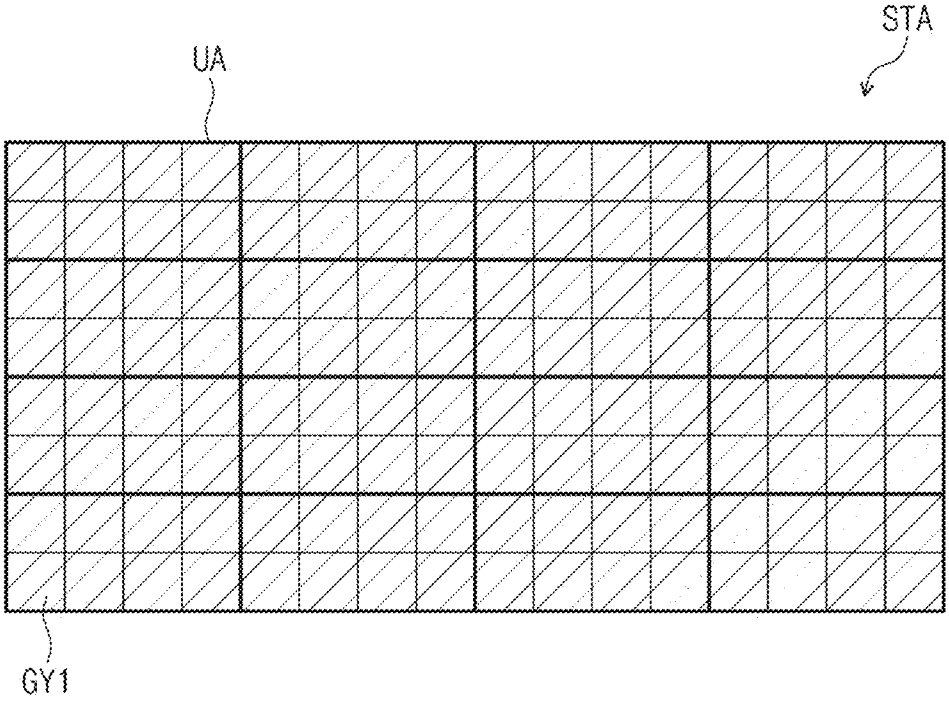
FIGS. 7A and 7B are conceptual diagrams for describing an embodiment of a dithering pattern, according to the disclosure.
Figure 7B:
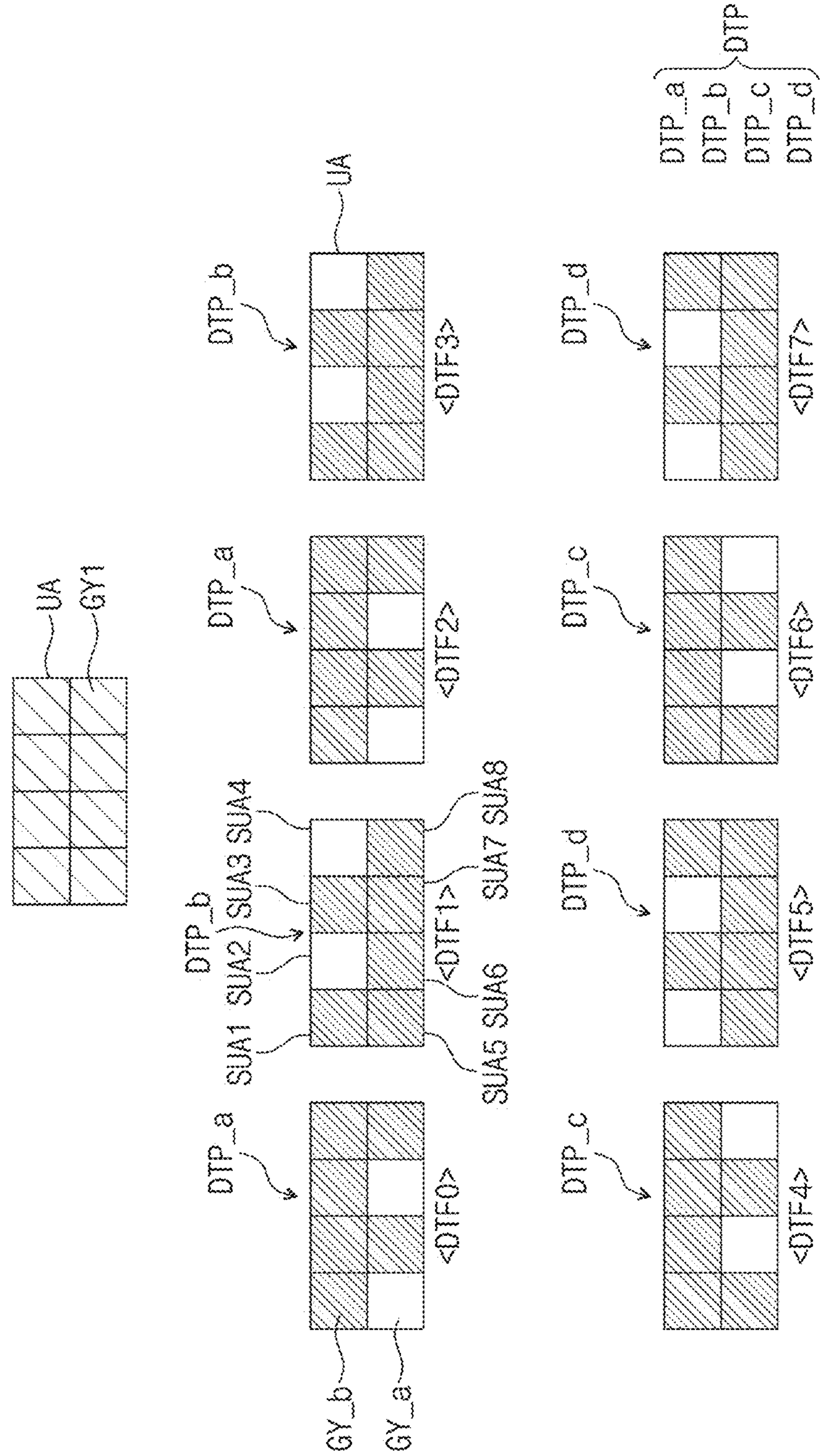
Figure 8:
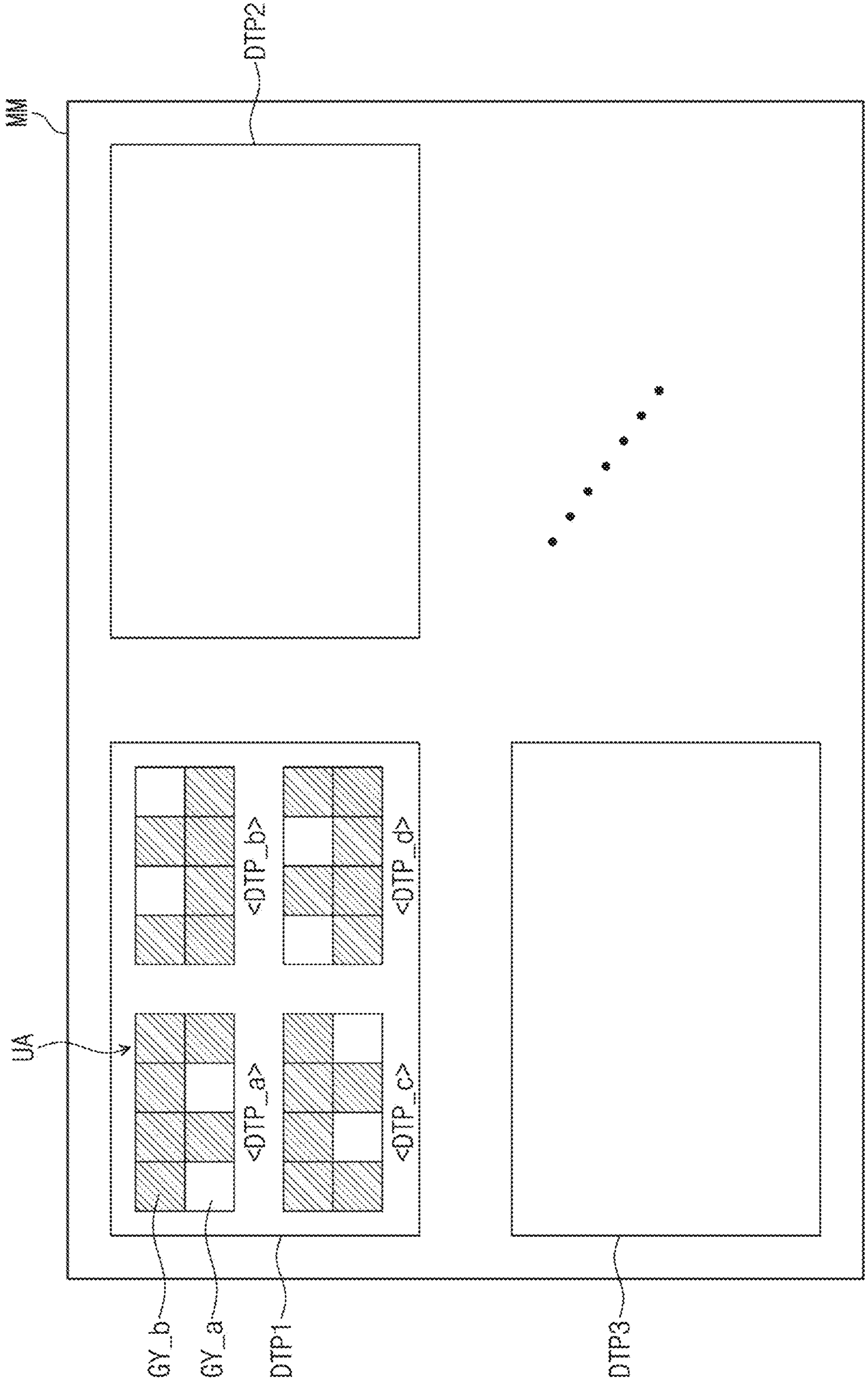
FIG. 8 is a conceptual diagram for describing an embodiment of a memory, according to the disclosure.
Figure 9:
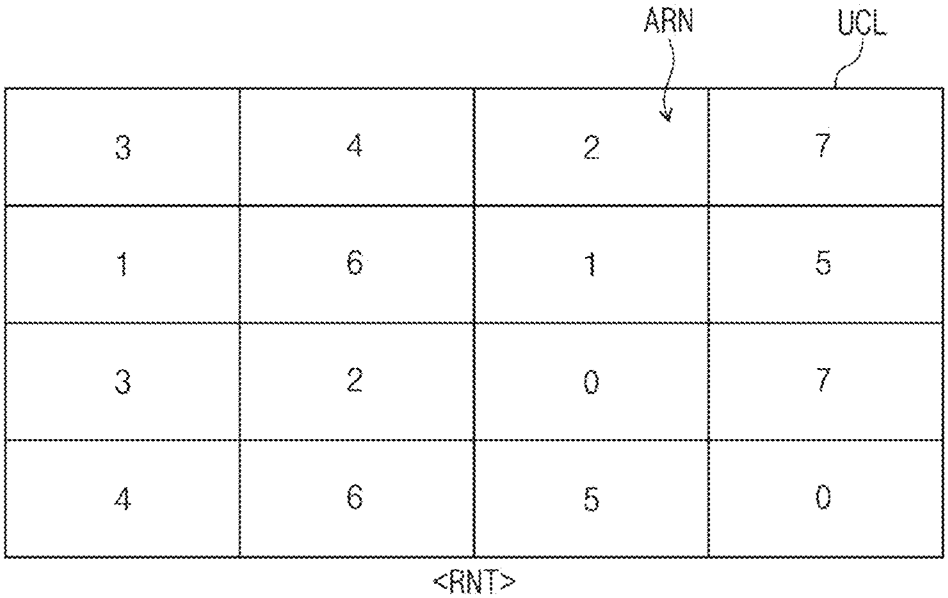
FIG. 9 is a conceptual diagram illustrating an embodiment of a random number table, according to the disclosure.
Figure 10:
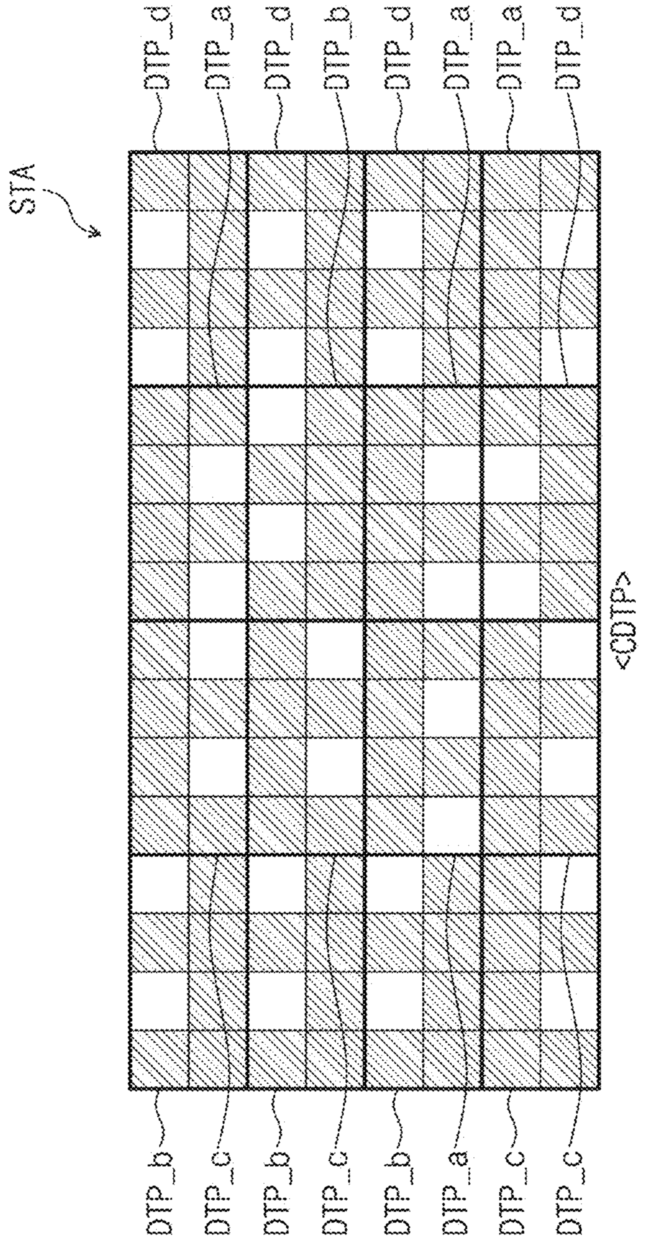
FIG. 10 is a conceptual diagram for describing an embodiment of a compensation dithering pattern, according to the disclosure.

FIG. 5 is a block diagram for describing an embodiment of a configuration of a controller, according to the disclosure. FIG. 6 is a conceptual diagram for describing an embodiment of an operation of a dithering judgment block, according to the disclosure. FIGS. 7A and 7B are conceptual diagrams for describing an embodiment of a dithering pattern, according to the disclosure. FIG. 8 is a conceptual diagram for describing an embodiment of a memory, according to the disclosure. FIG. 9 is a conceptual diagram illustrating an embodiment of a random number table, according to the disclosure. FIG. 10 is a conceptual diagram for describing an embodiment of a compensation dithering pattern, according to the disclosure.

Referring to FIG. 5, a controller CP_a includes a dithering judgment block DJB, a dithering compensation block DCB_a, a memory MM, and a data conversion block DTB.

Referring to FIGS. 5 and 6, the dithering judgment block DJB receives the input image signal RGB and determines whether a first sub-image signal SRGB1 and a second sub-image signal SRGB2 are included in the input image signal RGB.

The input image signal RGB may include the first sub-image signal SRGB1 corresponding to a first image IM1 and the second sub-image signal SRGB2 corresponding to a second image IM2. The first image IM1 is an image having a first grayscale GY1 (hereinafter also referred to as a "stain grayscale"), and the second image IM2 is an image having a second grayscale. In an embodiment of the disclosure, when the input image signal RGB includes the first and second sub-image signals SRGB1 and SRGB2, the display area DA may include a stain area STA where the first image IM1 is displayed and a non-stain area NSTA where the second image IM2 is displayed. However, the disclosure is not limited thereto. In an embodiment, only the first sub-image signal SRGB1 may be included in the input image signal RGB, or only the second sub-image signal SRGB2 may be included in the input image signal RGB, for example. When only the first sub-image signal SRGB1 is included in the input image signal RGB, the stain area STA may correspond to the entire display area DA. When only the second sub-image signal SRGB2 is included in the input image signal RGB, the non-stain area NSTA may correspond to the entire display area DA. Furthermore, the input image signal RGB may further include sub-image signals corresponding to additional images as well as the first and second images IM1 and IM2. In this case, in addition to the stain area STA and the non-stain area NSTA, the display area DA may further include additional areas where the additional images are displayed. Hereinafter, in the description of FIGS. 5 to 7B, it is described that the first and second sub-image signals SRGB1 and SRGB2 are included in the input image signal RGB.

In an embodiment of the disclosure, the dithering judgment block DJB receives a reference grayscale signal RGY. The reference grayscale signal RGY includes information about a reference grayscale, which serves as a reference for distinguishing between the first sub-image signal SRGB1 and the second sub-image signal SRGB2.

The dithering judgment block DJB classifies input image signal, which corresponds to an image having a grayscale equal to or lower than the reference grayscale, from among the input image signal RGB as the first sub-image signal SRGB1. In an embodiment of the disclosure, the stain grayscale GY1 is a grayscale equal to or lower than the reference grayscale. The first image IM1 corresponding to the stain grayscale GY1 may be an image requiring dithering. The dithering will be described later with reference to the description of FIG. 7.

The dithering judgment block DJB classifies input image signal, which corresponds to an image having a grayscale higher than the reference grayscale, from among the input image signal RGB as the second sub-image signal SRGB2. In an embodiment of the disclosure, the second grayscale is higher than the reference grayscale.

Referring to FIGS. 5, 7A, and 7B, the dithering compensation block DCB_a receives the first sub-image signal SRGB1 from the dithering judgment block DJB. The dithering compensation block DCB_a generates a correction image signal CRGB_a by correcting the first sub-image signal SRGB1 through dithering. The dithering compensation block DCB_a provides the correction image signal CRGB_a to the data conversion block DTB.

The dithering compensation block DCB_a receives a unit area signal UAS. The unit area signal UAS includes information about a unit area UA of a dithering pattern DTP to be described later. The dithering compensation block DCB_a may calculate coordinate information at which the image IM included in the first sub-image signal SRGB1 is displayed in the display area DA. The dithering compensation block DCB_a may calculate the coordinate information of the first sub-image signal SRGB1 provided over time based on the size, resolution, and operating frequency of the display panel DP. The dithering compensation block DCB_a may calculate coordinate information of the stain area STA based on the calculated coordinate information of the first sub-image signal SRGB1. The dithering compensation block DCB_a may divide the stain area STA into the unit area UA based on the information about the unit area UA included in the unit area signal UAS. In an embodiment of the disclosure, when the size area of the stain area STA is greater than the size area of the unit area UA, the dithering compensation block DCB_a may divide the stain area STA into a plurality of unit areas UA. However, the disclosure is not limited thereto. In an embodiment, when the size area of the stain area STA is the same as the size area of the unit area UA, the stain area STA may correspond to single unit area UA, for example. A plurality of pixels may correspond to each unit area UA.

The dithering compensation block DCB_a compensates for the first sub-image signal SRGB1 through dithering. The dithering refers to an image processing scheme for displaying a predetermined grayscale by a limited grayscale. The dithering pattern DTP refers to a pattern used to display the image IM (refer to FIG. 1) during dithering. In an embodiment of the disclosure, the dithering pattern DTP is displayed on the unit area UA of the display panel DP (refer to FIG. 6). The dithering pattern DTP includes a plurality of sub-unit areas SUA1 to SUA8. In an embodiment of the disclosure, each of the sub-unit areas SUA1 to SUA8 may correspond to the one pixel PX (refer to FIG. 3). However, the disclosure is not limited thereto. In an embodiment, each of the sub-unit areas SUA1 to SUA8 may correspond to the plurality of pixels PX, for example. In addition, FIG. 7A illustrates that the one unit area UA is arranged in 2×4 array (i.e., including 8 sub-unit areas SUA1 to SUA8). However, the disclosure is not limited thereto. The one unit area UA may include N×M sub-unit areas. Here, 'N' and 'M' may be natural numbers greater than or equal to 1.

In an embodiment of the disclosure, the display panel DP may display an image having the stain grayscale GY1 in the unit area UA by dithering through the dithering pattern DTP. Each of the images displayed in the sub-unit areas SUA1 to SUA8 included in the dithering pattern DTP may have a first dithering grayscale GY_a or a second dithering grayscale GY_b. In an embodiment of the disclosure, FIG. 7 illustrates that each of the images displayed in two sub-unit areas among the eight sub-unit areas SUA1 to SUA8 has the first dithering grayscale GY_a, and each of the images displayed in six sub-unit areas thereof has the second dithering grayscale GY_b. In this case, each of the first dithering grayscale GY_a and the second dithering grayscale GY_b is determined such that the average grayscale of an image displayed in the unit area UA where the dithering pattern DTP is displayed becomes the stain grayscale GY1. The level of the first dithering grayscale GY_a may be greater than that of the stain grayscale GY1 and the level of the second dithering grayscale GY_b may be smaller than that of the stain grayscale GY1. In an embodiment of the disclosure, when the second dithering grayscale GY_b has a grayscale of 0 gray, the level of the first dithering grayscale GY_a may be four times the level of the stain grayscale GY1. In this case, the grayscale of an image displayed in the unit area UA in the case where all images displayed in eight sub-unit areas SUA1 to SUA8 have the stain grayscale GY1 is the same as the grayscale of an image displayed in the unit area UA through the dithering pattern DTP. Hereinafter, it is described that the image displayed on the unit area UA through the dithering pattern DTP has the stain grayscale GY1.

Referring to FIG. 7B, the dithering pattern DTP includes a first sub-dithering pattern DTP_a, a second sub-dithering pattern DTP_b, a third sub-dithering pattern DTP_c, and a fourth sub-dithering pattern DTP_d. In an embodiment of the disclosure, locations of two sub-unit areas, in each of which an image having the first dithering grayscale GY_a is displayed, may be changed in the dithering pattern DTP. The locations of the two sub-unit areas, in each of which the image having the first dithering grayscale GY_a included in each of the first to fourth sub-dithering patterns DTP_a, DTP_b, DTP_c, and DTP_d, are displayed are different from each other. In the first sub-dithering pattern DTP_a, an image having the first dithering grayscale GY_a is displayed in each of the fifth and seventh sub-unit areas SUA5 and SUA7. In an embodiment of the disclosure, the dithering compensation block DCB_a may compensate for the first sub-image signal SRGB1 through dithering using one of the first to fourth sub-dithering patterns DTP_a, DTP_b, DTP_c, and DTP_d.

Moreover, the display panel DP may display an image having the stain grayscale GY1 in the unit area UA by 'n' dithering frames, in each of which the dithering pattern DTP having the stain grayscale GY1 is displayed, as one dithering period. In an embodiment of the disclosure, the display panel DP may display the image having the stain grayscale GY1 in the unit area UA by eight dithering frames DTF0 to DTF7 as one dithering period. In this case, the display panel DP may display the image having the stain grayscale GY1 in the unit area UA by at least two or more sub-dithering patterns, which are different from each other (arrangements of sub-unit areas where images having the first dithering grayscale GY_a are displayed are different from one another), within one dithering period. In an embodiment of the disclosure, in each of the first and third dithering frames DTF0 and DFT2, the first sub-dithering pattern DTP_a is displayed in the unit area UA. In each of the second and fourth dithering frames DTF1 and DTF3, the second sub-dithering pattern DTP_b is displayed in the unit area UA. In the fifth and seventh dithering frames DTF4 and DTF6, the third sub-dithering pattern DTP_c is displayed in the unit area UA. In the sixth and eighth dithering frames DTF5 and DTF7, the fourth sub-dithering pattern DTP_d is displayed in the unit area UA. As compared to displaying an image having the stain grayscale GY1 by the same sub-dithering pattern during the first to eighth dithering frames DTF0 to DTF7, in an embodiment of the disclosure, it is possible to improve the display quality of the display panel DP when the image having the stain grayscale GY1 is displayed by at least two or more sub-dithering patterns, which are different from one another, during the first to eighth dithering frames DTF0 to DTF7. In detail, it is possible to prevent a user of the display panel DP from perceiving that a sub-unit area where the image having the first dithering grayscale GY_a is displayed is distinguished from a sub-unit area where the image having the second dithering grayscale GY_b is displayed.

In an embodiment of the disclosure, the dithering pattern DTP may include five or more sub-dithering patterns different from one another. In an embodiment of the disclosure, the dithering patterns DTP may include eight sub-dithering patterns different from one another. In this case, sub-dithering patterns, which are different from one another, in the first to eighth dithering frames DTF0 to DTF7 may be displayed in the unit area UA.

Referring to FIGS. 5 and 8, a plurality of dithering patterns corresponding to grayscales of images displayed in the unit area UA may be stored in the memory MM. In an embodiment of the disclosure, the memory MM may store a first dithering pattern DTP1 for displaying an image having a first target grayscale in the unit area UA, a second dithering pattern DTP2 for displaying an image having a second target grayscale in the unit area UA, and a third dithering pattern DTP3 for displaying an image having a third target grayscale in the unit area UA. The images having the first to third target grayscales may be images requiring dithering. In an embodiment of the disclosure, the first target grayscale may be equal to or lower than the reference grayscale. The first target grayscale is lower than the second target grayscale. The second target grayscale is lower than the third target grayscale. However, the disclosure is not limited thereto. In an embodiment, a plurality of dithering patterns corresponding to a grayscale lower than the third target grayscale may be stored in the memory MM, for example. Furthermore, in an embodiment of the disclosure, when dithering is applied to an image having a grayscale higher than the reference grayscale, the memory MM may further store a dithering pattern for displaying an image having a grayscale higher than the reference grayscale.

Besides, each dithering pattern may include a plurality of sub-dithering patterns. Hereinafter, for convenience of description, it is described that the first target grayscale is the stain grayscale GY1, and the first dithering pattern DTP1 includes the first to fourth sub-dithering patterns DTP_a, DTP_b, DTP_c, and DTP_d.

To read out the first dithering pattern DTP1 corresponding to the first sub-image signal SRGB1 among the dithering patterns from the memory MM, the dithering compensation block DCB_a provides a first request signal RQS1_*a* to the memory MM. The memory MM provides the first dithering pattern DTP1 to the dithering compensation block DCB_a in response to the first request signal RQS1_*a*. In an embodiment of the disclosure, the dithering compensation block DCB_a provides the first request signal RQS1_*a* to the memory MM and reads out the first to fourth sub-dithering patterns DTP_a, DTP_b, DTP_c, and DTP_d corresponding to the first sub-image signal SRGB1.

Referring to FIGS. 5, 7A, 7B, 9, and 10, the dithering compensation block DCB_a receives a random number table RNT. In an embodiment of the disclosure, the random number table RNT includes a plurality of unit cells UCL respectively corresponding to the unit areas UA included in the stain area STA. The random number table RNT includes a plurality of area random numbers ARN allocated to the plurality of unit cells UCL. The dithering compensation block DCB_a generates a compensation dithering pattern CDTP based on the random number table RNT and the first to fourth sub-dithering patterns DTP_a, DTP_b, DTP_c, and DTP_d read from the memory MM. Although not illustrated in drawings, the controller CP_a may further include a memory storing a plurality of random number tables corresponding to stain areas having various size areas. In this case, the dithering compensation block DCB_a may read out a random number table, which corresponds to the stain area STA, from among a plurality of random number tables from the memory based on the first sub-image signal SRGB1.

In an embodiment of the disclosure, the area random numbers ARN may respectively correspond to the first to eighth dithering frames DTF0 to DTF7, in each of which the display panel DP displays an image having the stain grayscale GY1 by the first to fourth sub-dithering patterns DTP_a, DTP_b, DTP_c, and DTP_d. In an embodiment of the disclosure, when the display panel DP displays an image by 'n' dithering frames as one dithering period, each of the area random numbers ARN may have a value between '0' and 'n−1'. In this case, each of the area random numbers ARN is a natural number.

In an embodiment of the disclosure, the dithering compensation block DCB_a may generate the compensation dithering pattern CDTP, which includes a plurality of sub-dithering patterns DTP_a, DTP_b, DTP_c, and DTP_d displayed in each of the plurality of unit areas UA included in the stain area STA where the first image IM1 (refer to FIG. 6) is displayed, by the random number table RNT. In an embodiment of the disclosure, the dithering compensation block DCB_a may allow the compensation dithering pattern CDTP to include the first sub-dithering pattern DTP_a, which is displayed in each of the first and third dithering frames DTF0 and DTF2, in a unit cell UCL including area random numbers of "0" and "2". The dithering compensation block DCB_a may allow the compensation dithering pattern CDTP to include the second sub-dithering pattern DTP_b, which is displayed in the each of second and fourth dithering frames DTF1 and DTF3, in a unit cell UCL including area random numbers of "1" and "3". The dithering compensation block DCB_a may allow the compensation dithering pattern CDTP to include the third sub-dithering pattern DTP_c, which is displayed in each of the fifth and seventh dithering frames DTF4 and DTF6, in a unit cell UCL including area random numbers of "4" and "6". The dithering compensation block DCB_a may allow the compensation dithering pattern CDTP to include the fourth sub-dithering pattern DTP_d, which is displayed in each of the sixth and eighth dithering frames DTF5 and DTF7, in a unit cell UCL including area random numbers of "5" and "7". In this case, the area random numbers ARN included in the random number table RNT are not arranged depending on a rule, but have a random arrangement. Accordingly, the first to fourth sub-dithering patterns DTP_a, DTP_b, DTP_c, and DTP_d included in the compensation dithering pattern CDTP are not arranged depending on a rule, but have a random arrangement.

The dithering compensation block DCB_a generates the correction image signal CRGB_a based on the compensation dithering pattern CDTP and the first sub-image signal SRGB1. In an embodiment of the disclosure, the dithering compensation block DCB_a may generate the correction image signal CRGB_a by comparing the pattern of the first image IM1 included in the first sub-image signal SRGB1 with the compensation dithering pattern CDTP. When a pattern of the first image IM1 included in the first sub-image signal SRGB1 is a special pattern in which only a first predetermined pixel is turned on among pixels included in the display panel DP (refer to FIG. 3) and the remaining second pixels thereof are not turned on, the correction image signal CRGB_a may be generated such that only pixels of a pattern corresponding to the first pixel among the compensation dithering pattern CDTP are turned on. Because the first to fourth sub-dithering patterns DTP_a, DTP_b, DTP_c, and DTP_d have a random arrangement, the compensation dithering pattern CDTP in an embodiment of the disclosure may prevent all pixels in the stain area STA from not being turned on at each dithering frame even when the pattern of the first image IM1 is the special pattern. Accordingly, a user employing the display device DD does not perceive flicker, thereby improving the display quality of the display device DD.

Moreover, when all pixels turned on in the compensation dithering pattern CDTP correspond to pixels, which are turned on in a pattern of the first image IM1 included in the first sub-image signal SRGB1 (i.e., when the pattern of the first image IM1 is not the special pattern), the correction image signal CRGB_a may generate the correction image signal CRGB_a by the compensation dithering pattern CDTP. In this case, because the first to fourth sub-dithering patterns DTP_a, DTP_b, DTP_c, and DTP_d have a random arrangement, it is possible to prevent predetermined pixels in the stain area STA from not being turned on at each dithering frame as comparing with a case that the compensation dithering pattern CDTP consists of only one of the first to fourth sub-dithering patterns DTP_a, DTP_b, DTP_c, and DTP_d. The disclosure may prevent a user of the display panel DP from perceiving that a sub-unit area where the image having the first dithering grayscale GY_a is displayed is distinguished from a sub-unit area where the image having the second dithering grayscale GY_b is displayed, in a lattice form.

However, the disclosure is not limited thereto. In an embodiment, the dithering compensation block DCB_a may generate the correction image signal CRGB_a based on the compensation dithering pattern CDTP, for example.

Referring to FIG. 5, the data conversion block DTB receives the correction image signal CRGB_a from the dithering compensation block DCB_a. The data conversion block DTB generates image data IMD_a based on the correction image signal CRGB_a and provides the image data IMD_a to the source driver SD (refer to FIG. 3). Also, when the dithering judgment block DJB determines that the input image signal RGB includes the second sub-image signal SRGB2 corresponding to the second image IM2, the data conversion block DTB receives the second sub-image signal SRGB2. In this case, the data conversion block DTB may generate the image data IMD_a based on the correction image signal CRGB_a and the second sub-image signal SRGB2.

Figure 11:
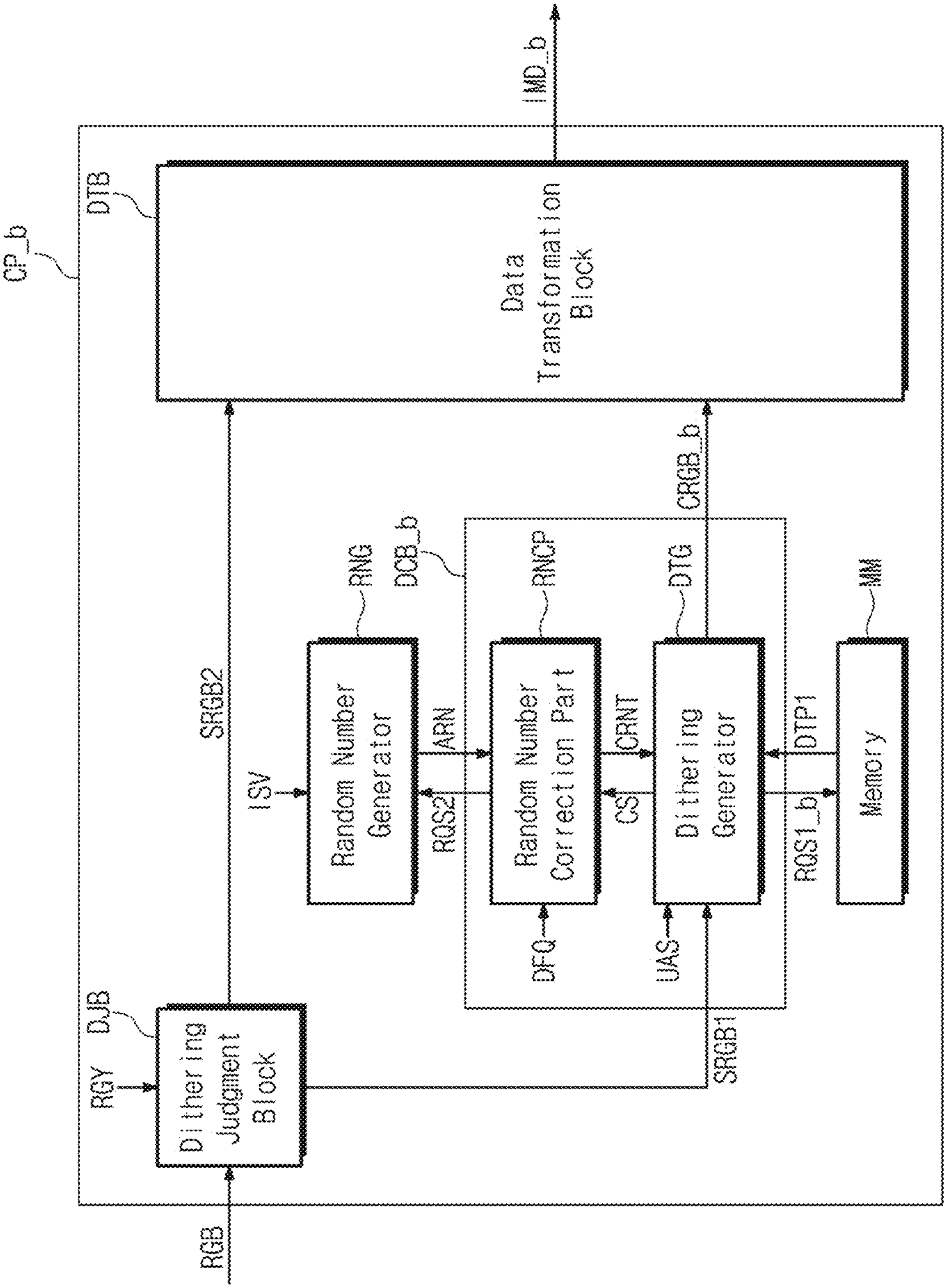
FIG. 11 is a block diagram for describing an embodiment of a configuration of a controller, according to the disclosure.
Figure 12:
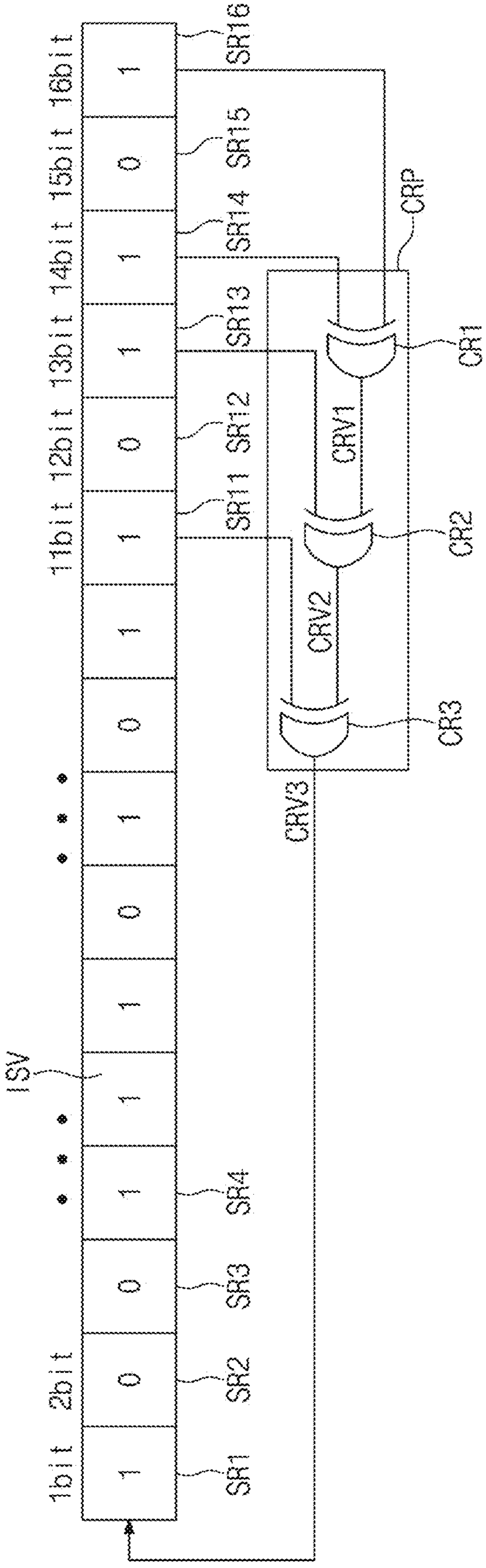
FIG. 12 is a conceptual diagram illustrating an embodiment of a random number generator, according to the disclosure.
Figure 13:
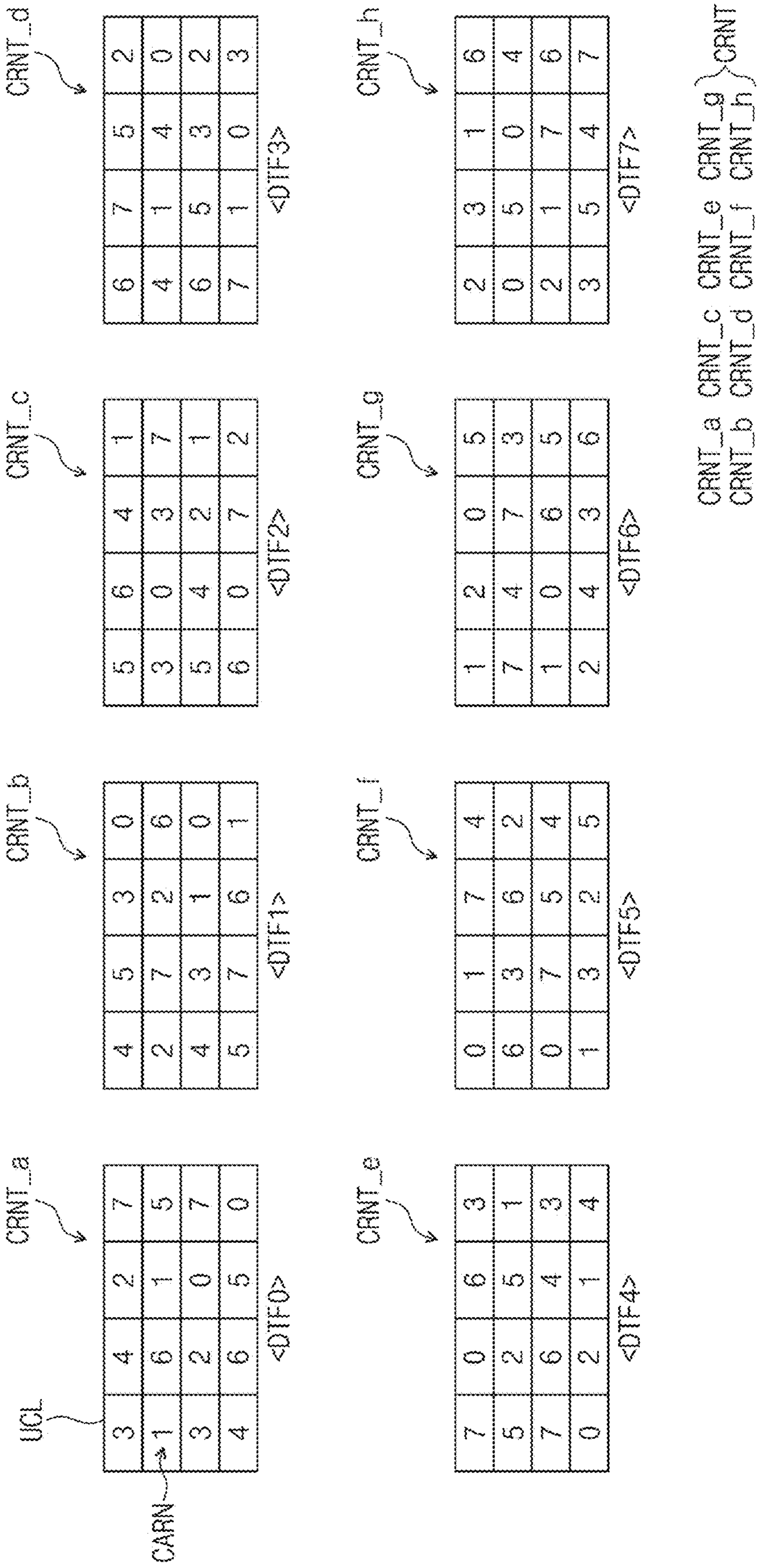
FIG. 13 is a conceptual diagram illustrating an embodiment of a correction random number table, according to the disclosure.

FIG. 11 is a block diagram for describing an embodiment of a configuration of a controller, according to the disclosure. FIG. 12 is a conceptual diagram illustrating an embodiment of a random number generator, according to the disclosure. FIG. 13 is a conceptual diagram illustrating an embodiment of a correction random number table, according to the disclosure. Hereinafter, configurations and signals that are the same as configurations and signals described with reference to FIGS. 5 to 10 are marked by the same reference numerals, and thus, additional description will be omitted to avoid redundancy.

Referring to FIGS. 11 and 12, the controller CP_b may include the dithering judgment block DJB, a dithering compensation block DCB_b, the memory MM, the random number generator RNG, and the data conversion block DTB.

In an embodiment of the disclosure, the random number generator RNG may generate a plurality of random numbers. In an embodiment of the disclosure, when the display panel DP uses 'n' dithering frames as one dithering period, the random number generator RNG generates 'n' random numbers, where 'n' is a natural number.

In an embodiment of the disclosure, the random number generator RNG may include a linear feedback shift register. The linear feedback shift register may include a plurality of shift registers SR1 to SR16 and an operation block CRP. FIG. 12 illustrates that sixteen shift registers SR1 to SR16 correspond to first to sixteenth bits, but the disclosure is not limited thereto. The linear feedback shift register may include shift registers of which the number is smaller than or greater than 16. An initial seed value ISV is stored in the plurality of shift registers SR1 to SR16. The initial seed value ISV includes a logical value ("0" or "1") stored in each of the sixteen shift registers SR1 to SR16 respectively corresponding to the first to sixteenth bits. The same initial seed value ISV is provided to the linear feedback shift register at each dithering frame of the display panel DP. Accordingly, initial values of the linear feedback shift register may be the same as one another at each dithering frame of the display panel DP.

The output of the operation block CRP is provided to the first shift register SR1 among the plurality of shift registers SR1 to SR16, and logical values stored in the shift register SR1 to SR16 are shifted to adjacent shift registers and then are stored. The output is determined by the initial seed value ISV stored in the linear feedback shift register.

In an embodiment of the disclosure, the operation block CRP includes a first operation part CR1, a second operation part CR2, and a third operation part CR3. The first operation part CR1 outputs a first operation value CRV1 by performing an exclusive OR on a logical value of '1' stored in the fourteenth shift register SR14 and a logical value of '1' stored in the sixteenth shift register SR16. The second operation part CR2 outputs a second operation value CRV2 by performing an exclusive OR on the first operation value CRV1 and a logical value of '1' stored in the thirteenth shift register SR13. The third operation part CR3 outputs a third operation value CRV3 by performing an exclusive OR on the second operation value CRV2 and a logical value of '1' stored in the eleventh shift register SR11. The first shift register SR1 receives and stores an output (i.e., the third operation value CRV3) of the third operation part SR3.

The linear feedback shift register may generate random numbers based on logical values stored in an arbitrary shift register among the plurality of shift registers SR1 to SR16 as desired. In an embodiment of the disclosure, when the display panel DP uses eight dithering frames DTF0 to DTF7 as one dithering period, the linear feedback shift register generates eight random numbers. In this case, the linear feedback shift register may generate eight random numbers based on logical values stored in three arbitrary shift registers among the plurality of shift registers SR1 to SR16.

Referring to FIGS. 11 and 13, the dithering compensation block DCB_b includes a random number correction part RNCP and a dithering generator DTG. The dithering generator DTG may generate a division signal CS including information, which is obtained by dividing the stain area STA (refer to FIG. 6) into the plurality of unit areas UA, based on the unit area signal UAS and the first sub-image signal SRGB1. The random number correction part RNCP receives the division signal CS from the dithering generator DTG. The random number correction part RNCP provides the random number generator RNG with a second request signal RQS2 for allocating the area random numbers ARN of the random number table RNT (refer to FIG. 9) by eight random numbers. The random number correction part RNCP provides the second request signal RQS2 to the random number generator RNG, and reads out the area random numbers ARN from the random number generator RNG. The random number generator RNG generates the random number table RNT (refer to FIG. 9) based on the area random numbers ARN thus read out.

As for the same initial seed value ISV stored in the linear feedback shift register, the linear feedback shift register may always output the same random numbers. Accordingly, even when the display device DD does not separately include a memory storing a plurality of random number tables corresponding to stain areas of various size areas, the display device DD may receive the random number table RNT desired for a dithering operation. In detail, the random number table RNT desired for the dithering operation may be generated by varying the number of random numbers generated by a linear feedback shift register and the area random numbers ARN read by the random number correction part RNCP depending on the number of dithering frames included in a dithering period of the display panel DP, the number of sub-unit areas included in the unit area UA, and the arrangement of the sub-unit areas. In this way, it is possible to reduce costs and to secure free space in design.

The random number correction part RNCP receives a period signal DFQ including information about the dithering period of the display panel DP. The random number correction part RNCP may generate a correction random number table CRNT by correcting the random number table RNT based on the dithering period. The random number correction part RNCP generates correction area random numbers CARN by adding a predetermined weight to the area random numbers ARN included in the random number table RNT at each dithering frame included in the dithering period. The correction random number table CRNT includes the plurality of correction area random numbers CARN allocated to each of the plurality of unit cells UCL. In an embodiment of the disclosure, when 'n' dithering frames constitute one dithering period, the random number correction part RNCP generates the correction area random numbers CARN by adding a predetermined weight to the area random numbers ARN included in the random number table RNT in each of the 'n' dithering frames. In an embodiment of the disclosure, a weight added to the random number table RNT by the random number correction part RNCP at each dithering frame may be accumulated. Accordingly, the correction area random numbers CARN at the (n−1)-th dithering frame are different from the correction area random numbers CARN at the n-th dithering frame.

In an embodiment of the disclosure, the weight may be a natural number from 0 to 'n−1'. In this case, the random number correction part RNCP may generate the correction area random numbers CARN by sequentially adding the weight to the area random numbers ARN at each dithering frame. In this case, when numbers obtained by adding a weight to the area random numbers ARN are sum area random numbers, the correction area random numbers CARN are numbers obtained by subtracting 'n' from the sum area random numbers in the case where each of the sum area random numbers is greater than 'n'.

Referring to FIG. 13, at the first dithering frame DTF0, the random number correction part RNCP generates a first correction random number table CRNT_a having numbers, which are obtained by adding '0' to the area random numbers ARN, as the correction area random numbers CARN. At the second dithering frame DTF1, the random number correction part RNCP generates a second correction random number table CRNT b having numbers, which are obtained by adding '1' to the area random numbers ARN, as the correction area random numbers CARN. At the third dithering frame DTF2, the random number correction part RNCP generates a third correction random number table CRNT_c having numbers, which are obtained by adding '2' to the area random numbers ARN, as the correction area random numbers CARN. At the fourth dithering frame DTF3, the random number correction part RNCP generates a fourth correction random number table CRNT_d having numbers, which are obtained by adding '3' to the area random numbers ARN, as the correction area random numbers CARN. At the fifth dithering frame DTF4, the random number correction part RNCP generates a fifth correction random number table CRNT_e having numbers, which are obtained by adding '4' to the area random numbers ARN, as the correction area random numbers CARN. At the sixth dithering frame DTF5, the random number correction part RNCP generates a sixth correction random number table CRNT_f having numbers, which are obtained by adding '5' to the area random numbers ARN, as the correction area random numbers CARN. At the seventh dithering frame DTF6, the random number correction part RNCP generates a seventh correction random number table CRNT_g having numbers, which are obtained by adding '6' to the area random numbers ARN, as the correction area random numbers CARN. At the eighth dithering frame DTF7, the random number correction part RNCP generates an eighth correction random number table CRNT_h having numbers, which are obtained by adding '7' to the area random numbers ARN, as the correction area random numbers CARN. In this case, when each of numbers obtained by adding a number between '1' and '7' to the area random numbers ARN is equal to or greater than 8, the correction random number tables have a number, which is obtained by subtracting '7' from the corresponding number, as a correction area random number.

The dithering generator DTG provides a first request signal RQS1_*b* to the memory MM and reads out a first dithering pattern DTP1 from the memory MM. The dithering generator DTG provides the first request signal RQS1_*b* to the memory MM and reads out the first to fourth sub-dithering patterns DTP_a, DTP_b, DTP_c, and DTP_d (refer to FIG. 7B) from the memory MM.

The dithering generator DTG receives the first to eighth correction random number tables CRNT_a to CRNT_h from the random number correction part RNCP. The dithering generator DTG generates a plurality of compensation dithering patterns based on the first dithering pattern DTP1 and each of the first to eighth correction random number tables CRNT_a to CRNT_h. In detail, the dithering generator DTG generates compensation dithering patterns based on the first to fourth sub-dithering patterns DTP_a, DTP_b, DTP_c, and DTP_d and each of the first to eighth correction random number tables CRNT_a to CRNT_h.

In this case, because the correction area random numbers included in each of the first to eighth correction random number tables CRNT_a to CRNT_h are different from one another, compensation dithering patterns respectively corresponding to the first to eighth correction random number tables CRNT_a to CRNT_h also have different arrangements from one another. Accordingly, as compared to displaying an image having the stain grayscale GY1 by the same compensation dithering pattern during the first to eighth dithering frames DTF0 to DTF7, it is possible to improve the display quality of the display panel DP when the image having the stain grayscale GY1 is displayed by at least two or more compensation dithering patterns, which are different from one another, during the first to eighth dithering frames DTF0 to DTF7.

The dithering generator DTG generates a correction image signal CRGB_b based on compensation dithering patterns and the first sub-image signal SRGB1. However, the disclosure is not limited thereto. In an embodiment, the dithering generator DTG may generate the correction image signal CRGB_b based on the compensation dithering patterns, for example.

The data conversion block DTB receives the correction image signal CRGB_b from the dithering generator DTG. The data conversion block DTB generates image data IMD_b based on the correction image signal CRGB_b and provides the image data IMD_b to the source driver SD (refer to FIG. 3). Also, when the dithering judgment block DJB determines that the input image signal RGB includes the second sub-image signal SRGB2 corresponding to the second image IM2, the data conversion block DTB receives the second sub-image signal SRGB2. In this case, the data conversion block DTB may generate the image data IMD_b based on the correction image signal CRGB_b and the second sub-image signal SRGB2.

Figure 14:
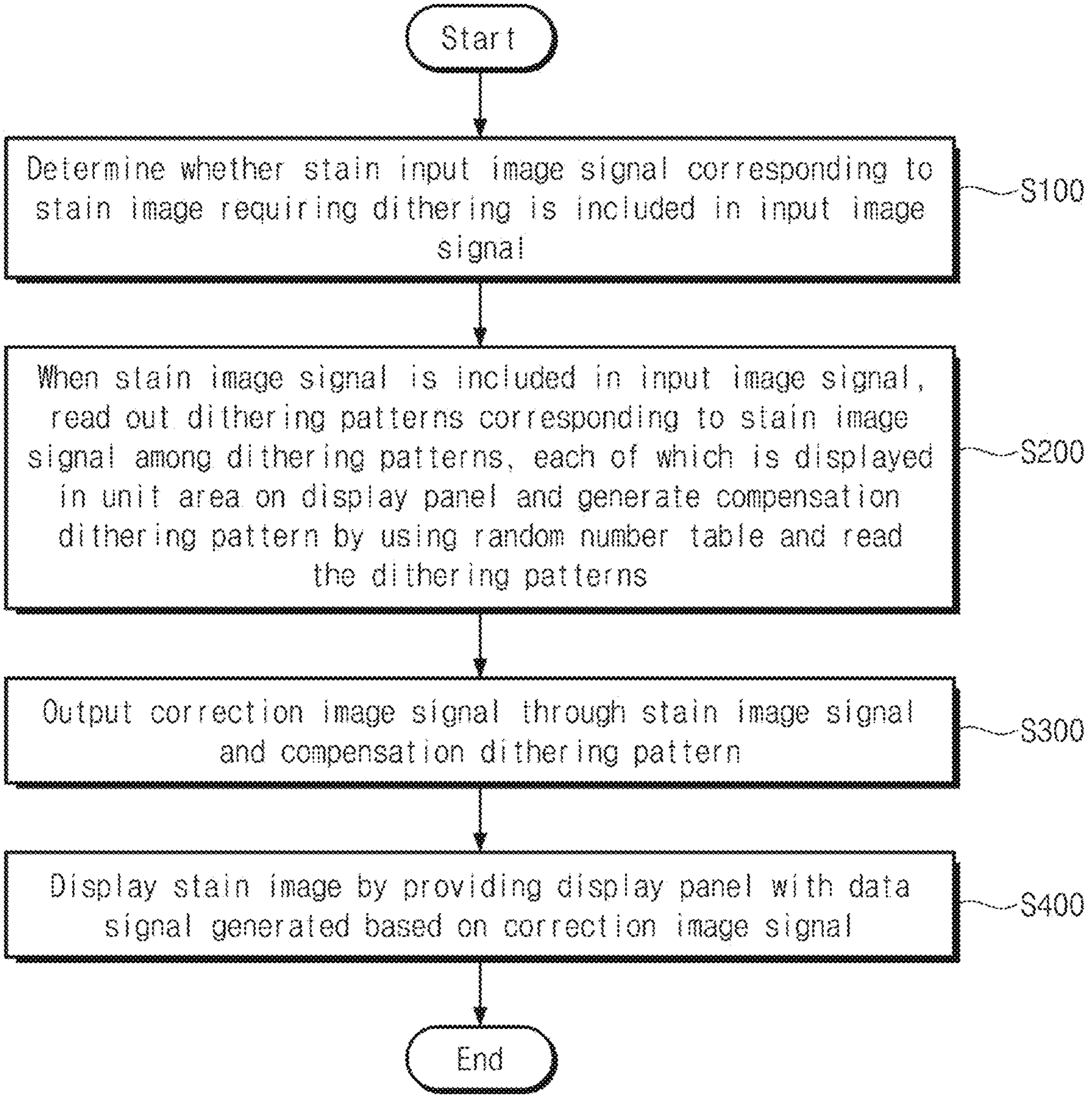
FIGS. 14 to 16 are flowcharts for describing an embodiment of a method of driving a display device, according to the disclosure.
Figure 15:
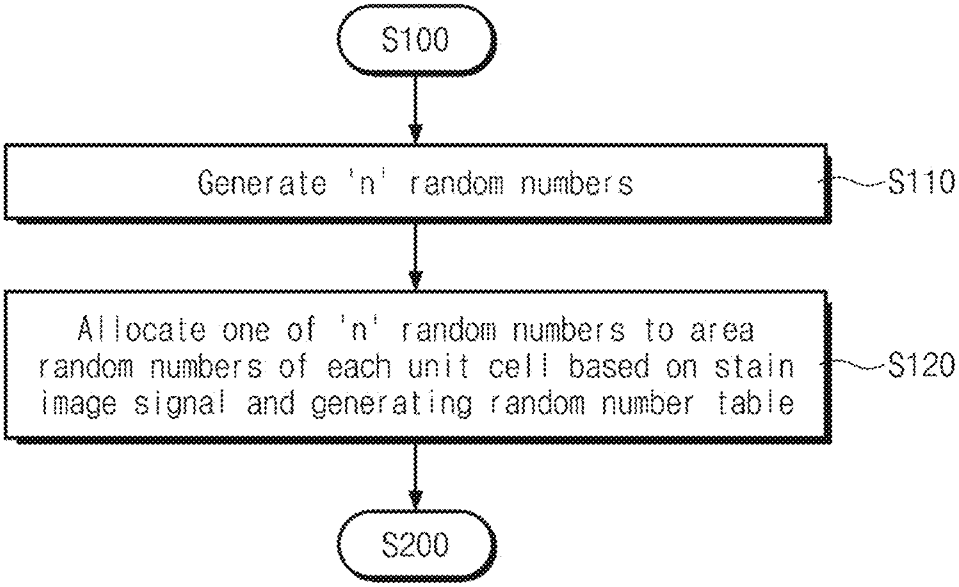
Figure 16:
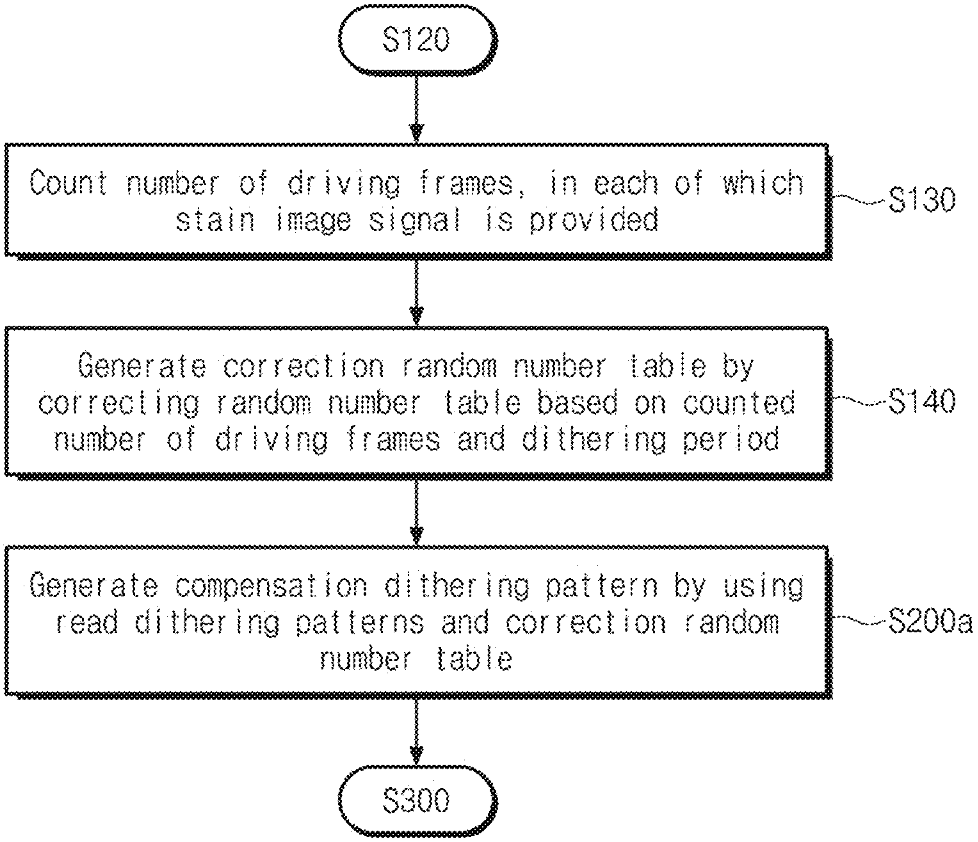

FIGS. 14 to 16 are flowcharts for describing an embodiment of a method of driving a display device, according to the disclosure.

Referring to FIGS. 5 and 14, a method of driving the display device DD includes operation S100 of determining whether the first sub-image signal SRGB1 (hereinafter also referred to as a "stain image signal") corresponding to the first image IM1 (refer to FIG. 6, hereinafter also referred to as a "stain image") requiring dithering is included in the input image signal RGB. In an embodiment of the disclosure, the display device DD may perform operation S100 of determining whether a stain image signal is included, through the dithering judgment block DJB.

The method of driving the display device DD includes operation of S200 of reading out first dithering patterns (hereinafter also referred to as dithering patterns for convenience) DTP1 corresponding to the stain image signal SRGB1 among the dithering patterns DTP (refer to FIG. 7B), each of which is displayed in the unit area UA (refer to FIG. 7A) on the display panel DP (refer to FIG. 6), and generating the compensation dithering pattern CDTP (refer to FIG. 10) by the random number table RNT and the read the dithering patterns DTP1, when the input image signal RGB includes the stain image signal SRGB1. In an embodiment of the disclosure, the display device DD may read out the dithering patterns DTP1 corresponding to the stain image signal SRGB1 from the memory MM through the dithering compensation block DCB_a. The dithering compensation block DCB_a may perform operation S200 of generating the compensation dithering pattern CDTP by the random number table RNT and the read dithering patterns DTP1.

The method of driving the display device DD includes operation S300 of outputting the correction image signal CRGB_a through the stain image signal SRGB1 and the compensation dithering pattern CDTP. In an embodiment of the disclosure, the display device DD may output the correction image signal CRGB_a through the dithering compensation block DCB_a.

The method of driving the display device DD includes operation S400 of displaying the stain image IM1 by providing the display panel DP (refer to FIG. 3) with the data signal DS (refer to FIG. 3), which is generated based on the correction image signal CRGB_a. In an embodiment of the disclosure, the display device DD may generate the image data IMD_a based on the correction image signal CRGB_a and may generate the data signal DS based on the image data IMD_a. Moreover, in an embodiment of the disclosure, in operation S100 of determining whether the stain image signal SRGB1 is included in the input image signal RGB, the display device DD may generate the data signal DS based on the stain image signal SRGB1 and the second sub-image signal SRGB2 when it is determined that the input image signal RGB includes the stain image signal SRGB1 and the second sub-image signal SRGB2.

Referring to FIGS. 11, 14, and 15, the method of driving the display device DD may include operation S110 of generating 'n' random numbers after operation S100 of determining whether the stain image signal SRGB1 is included in the input image signal RGB. In an embodiment of the disclosure, the display device DD may generate the 'n' random numbers through the random number generator RNG.

The method of driving the display device DD may further include operation S120 of allocating one of the 'n' random numbers to the area random numbers ARN (refer to FIG. 9) of each unit cell based on the stain image signal SRGB1 and generating the random number table RNT (refer to FIG. 9) after operation S110 of generating the 'n' random numbers. In an embodiment of the disclosure, the display device DD may read out the area random numbers ARN from the random number generator RNG through the random number correction part RNCP and may generate the random number table RNT.

Referring to FIGS. 11, 14, 15, and 16, the method of driving the display device DD may further include operation S140 of correcting the random number table RNT based on the dithering period of the display panel DP and generating the correction random number table CRNT after operation S120 of generating the random number table RNT. In an embodiment of the disclosure, the method of driving the display device DD may further include operation S130 of counting the number of driving frames of the display device DD, in each of which the stain image signal SRGB1 is provided, before operation S140 of generating the correction random number table CRNT. In this case, operation S140 of generating the correction random number table CRNT includes generating the correction random number table CRNT by correcting the random number table RNT based on the dithering period and the counted number of driving frames, in each of which the stain image signal SRGB1 is provided. The display device DD may generate the correction random number table CRNT through the random number correction part RNCP. In an embodiment of the disclosure, one dithering period may include 'n' dithering frames; the counted number of driving frames, in each of which the stain image signal SRGB1 is provided, is 'm' less than 'n'. In this case, the random number correction part RNCP may generate the correction random number table CRNT by sequentially adding the number from '0' to 'm−1' respectively corresponding to the 'm' driving frames, in each of which the stain image signal SRGB1 is provided, to the area random numbers ARN of the random number table RNT in the random number table RNT. Besides, the counted number of driving frames, in each of which the stain image signal SRGB1 is provided, may be 'k' greater than 'n', and 'k' may be a natural number. In this case, the random number correction part RNCP may generate the correction random number table CRNT by sequentially adding the number from '0' to 'n−1' corresponding to the 'k' driving frames, in each of which the stain image signal SRGB1 is provided, to the area random numbers ARN of the random number table RNT in the random number table RNT and adding the number, which increases from '0', to the area random numbers ARN of the random number table RNT from driving frames following the (n−1)-th driving frame. In this case, the method of driving the display device DD may include operation S220*a* of generating the compensation dithering pattern CDTP by the read dithering patterns DTP1 and the correction random number table CRNT.

Although an embodiment of the disclosure has been described for illustrative purposes, those skilled in the art will appreciate that various modifications, and substitutions are possible, without departing from the scope and spirit of the disclosure as disclosed in the accompanying claims. Accordingly, the technical scope of the disclosure is not limited to the detailed description of this specification, but should be defined by the claims.

In an embodiment of the disclosure, a display quality may be improved by displaying an image on a display panel based on a correction image signal generated by correcting an image signal corresponding to an image requiring dithering through a dithering pattern. The disclosure includes a memory in which a plurality of dithering patterns is stored, and generates a correction image signal through dithering patterns read from the memory by an input image signal and a random number table. Display quality may be improved by the correction image signal generated through a dithering pattern read by a random number table because pixels do not regularly display an image, but randomly display the image during a dithering operation.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:

a display panel which displays an image; and a panel driving block which receives an input image signal and controls driving of the display panel, the panel driving block including:

a dithering judgment block which determines whether a first sub-image signal corresponding to a first image requiring dithering is included in the input image signal;

a memory which stores a plurality of dithering patterns respectively displayed in a plurality of unit areas of the display panel; and a dithering compensation block which:

among the plurality of dithering patterns, reads out dithering patterns, which correspond to the first sub-image signal, from the memory;

generates a compensation dithering pattern by the read dithering patterns and a random number table; and outputs a correction image signal through the first sub-image signal and the compensation dithering pattern, wherein the first image is displayed in a stain area of the display panel, and the stain area includes at least one unit area, wherein the random number table includes a plurality of unit cells respectively corresponding to the plurality of unit areas included in the stain area and includes a plurality of area random numbers allocated to each of the plurality of unit cells.

2. The display device of claim 1, wherein, when a grayscale of the first image is a stain grayscale, the dithering judgment block determines whether the first sub-image signal is included in the input image signal, based on whether the stain grayscale is equal to or lower than a reference grayscale.

3. The display device of claim 2, wherein the display panel includes a plurality of pixels, wherein each of the plurality of unit areas corresponds to at least one pixel among the plurality of pixels.

4. The display device of claim 3, wherein, when the display panel displays the first image in the stain area by 'n' dithering frames, in each of which each of a plurality of dithering patterns having the stain grayscale is displayed, as one dithering period, the panel driving block further includes a random number generator generating 'n' random numbers where 'n' is a natural number, and wherein the dithering compensation block allocates one of the 'n' random numbers to an area random number of each of the plurality of unit cells among the plurality of area random numbers based on the first sub-image signal.

5. The display device of claim 4, wherein the random number generator includes a linear feedback shift register.

6. The display device of claim 5, wherein an initial seed value thus identical is provided to the random number generator at a respective dithering frame of the display panel among the 'n' dithering frames, and wherein the random number generator generates the 'n' random numbers by the initial seed value.

7. The display device of claim 4, wherein the dithering compensation block includes:

a dithering generator which generates the compensation dithering pattern based on the read dithering patterns and the random number table.

8. The display device of claim 7, wherein the dithering compensation block further includes:

a random number correction part which generates a correction random number table by correcting the random number table based on the one dithering period of the display panel, and wherein the dithering generator generates the compensation dithering pattern based on the read dithering patterns and the correction random number table.

9. The display device of claim 8, wherein the random number correction part generates a plurality of correction area random numbers by adding a predetermined weight to the plurality of area random numbers included in the random number table at a respective dithering frame among the 'n' dithering frames, and wherein the correction random number table includes the plurality of correction area random numbers.

10. The display device of claim 9, wherein the predetermined weight is a natural number from '0' to 'n−1', and wherein the random number correction part generates the plurality of correction area random numbers by sequentially adding the predetermined weight to the plurality of area random numbers at the respective dithering frame.

11. The display device of claim 1, wherein the panel driving block includes:

a controller which generates image data based on the input image signal; and a source driver which generates data signal based on the image data and provides the data signal to the display panel, wherein the dithering judgment block, the memory, and the dithering compensation block are included in the controller, and wherein the controller further includes:

a data conversion block which generates the image data based on the correction image signal.

12. The display device of claim 11, wherein the dithering judgment block further determines whether a second sub-image signal corresponding to a second image, which does not require dithering, is included in the input image signal, and wherein, when the first sub-image signal and the second sub-image signal are included in the input image signal, the data conversion block generates the image data based on the correction image signal and the second sub-image signal.

13. A method of driving a display device, the method comprising:

determining whether a stain image signal corresponding to a stain image requiring dithering is included in an input image signal;

when the stain image signal is included in the input image signal, reading out dithering patterns, which correspond to the stain image signal, from among a plurality of dithering patterns, each of which is displayed in a unit area on a display panel, and generating a compensation dithering pattern by a random number table and the read dithering patterns; and outputting a correction image signal through the stain image signal and the compensation dithering pattern, wherein the stain image is displayed in a stain area of the display panel, and the stain area includes a plurality of unit areas, wherein the random number table includes a plurality of unit cells respectively corresponding to the plurality of unit areas included in the stain area and includes a plurality of area random numbers allocated to each of the plurality of unit cells.

14. The method of claim 13, wherein the display panel includes a plurality of pixels, wherein each of the plurality of unit areas corresponds to at least one pixel among the plurality of pixels.

15. The method of claim 14, wherein, when a grayscale of the stain image is a stain grayscale, the display panel displays an image corresponding to the correction image signal by 'n' dithering frames, in each of which each of dithering patterns having the stain grayscale is displayed among the plurality of dithering patterns, as one dithering period where 'n' is a natural number.

16. The method of claim 15, further comprising:

after the determining whether the stain image signal is included in the input image signal, generating 'n' random numbers; and allocating one of the 'n' random numbers to an area random number of each of the plurality of unit cells based on the stain image signal and generating the random number table.

17. The method of claim 16, wherein the 'n' random numbers are generated by a linear feedback shift register, wherein an initial seed value thus identical is provided to the linear feedback shift register at a respective dithering frame of the display panel among the 'n' dithering frames, and wherein the linear feedback shift register generates the 'n' random numbers by the initial seed value.

18. The method of claim 16, further comprising:

after the generating the random number table, generating a correction random number table by correcting the random number table based on the one dithering period of the display panel, wherein the generating the compensation dithering pattern includes:

generating the compensation dithering pattern by the read dithering patterns and the correction random number table.

19. The method of claim 18, further comprising:

before the generating the correction random number table, counting the number of driving frames, in each of which the stain image signal is provided, wherein the generating the correction random number table includes:

generating the correction random number table by correcting the random number table based on the counted number of driving frames and the one dithering period.

20. The method of claim 13, further comprising:

displaying the stain image by providing the display panel with a data signal generated based on the correction image signal.

* * * * *